United States Patent
Xiu et al.

(10) Patent No.: US 10,057,594 B2
(45) Date of Patent: Aug. 21, 2018

(54) ENHANCED TEMPORAL MOTION VECTOR PREDICTION FOR SCALABLE VIDEO CODING

(71) Applicant: Vid Scale, Inc., Wilmington, DE (US)

(72) Inventors: Xiaoyu Xiu, San Diego, CA (US); Yuwen He, San Diego, CA (US); Yan Ye, San Diego, CA (US); Yong He, San Diego, CA (US)

(73) Assignee: VID SCALE, Inc., Wilmington, DE (US)

( * ) Notice: Subject to any disclaimer, the term of this patent is extended or adjusted under 35 U.S.C. 154(b) by 382 days.

(21) Appl. No.: 14/781,728

(22) PCT Filed: Apr. 2, 2014

(86) PCT No.: PCT/US2014/032605
§ 371 (c)(1),
(2) Date: Oct. 1, 2015

(87) PCT Pub. No.: WO2014/165555
PCT Pub. Date: Oct. 9, 2014

(65) Prior Publication Data
US 2016/0050430 A1    Feb. 18, 2016

Related U.S. Application Data

(60) Provisional application No. 61/807,639, filed on Apr. 2, 2013.

(51) Int. Cl.
*H04N 19/513* (2014.01)
*H04N 19/52* (2014.01)
(Continued)

(52) U.S. Cl.
CPC ......... *H04N 19/513* (2014.11); *H04N 19/172* (2014.11); *H04N 19/31* (2014.11);
(Continued)

(58) Field of Classification Search
CPC ...... H04N 19/172; H04N 19/31; H04N 19/33; H04N 19/46; H04N 19/513; H04N 19/52; H04N 19/58; H04N 19/587; H04N 19/59
See application file for complete search history.

(56) References Cited

U.S. PATENT DOCUMENTS 9,264,734 B2 *   2/2016   Park .................... H04N 19/52
9,800,857 B2 *  10/2017   Zhang ............... H04N 13/0048
(Continued)

FOREIGN PATENT DOCUMENTS

| CN | 102714736 A | 10/2012 |
| WO | WO 2012/006889 A1 | 1/2012 |
| WO | WO 2014/050675 A1 | 4/2014 |

OTHER PUBLICATIONS

Bross et al., "High Efficiency Video Coding (HEVC) Text Specification Draft 7", Document: JCTVC-I1003_d98, Joint Collaborative Team on Video Coding (JCT-VC) of ITU-T SG16 WP3 and ISO/IEC JTC1/SC29/WG11 9th Meeting: Geneva, CH, Apr. 27-May 7, 2012, 6 pages.
(Continued)

*Primary Examiner* — Anner N Holder
(74) *Attorney, Agent, or Firm* — Condo Roccia Koptiw LLP

(57) ABSTRACT

In enhancement layer (EL) coding, the temporal candidate (s) may be derived the merge mode and the non-merge mode. Selection of the reference index of a current prediction unit (PU) and of the reference list of a co-located PU may be considered jointly when constructing the temporal candidate of EL for the merge mode. The selection^) may be made such that a motion vector (MV) scaling operation may be avoided. A selected motion vector prediction candidate may be added to a merging candidate list in a position before that of a spatial motion vector prediction candidate. A
(Continued)

selected motion vector prediction candidate may be added to the merging candidate list in place of a spatial motion vector prediction candidate.

19 Claims, 21 Drawing Sheets

(51) Int. Cl.
    *H04N 19/33*     (2014.01)
    *H04N 19/31*     (2014.01)
    *H04N 19/587*     (2014.01)
    *H04N 19/172*     (2014.01)
    *H04N 19/46*     (2014.01)
    *H04N 19/58*     (2014.01)
    *H04N 19/59*     (2014.01)
(52) U.S. Cl.
    CPC ............ *H04N 19/33* (2014.11); *H04N 19/52* (2014.11); *H04N 19/587* (2014.11); *H04N 19/46* (2014.11); *H04N 19/58* (2014.11); *H04N 19/59* (2014.11)

(56) References Cited

U.S. PATENT DOCUMENTS

| | | | |
|---|---|---|---|
| 2009/0238269 A1* | 9/2009 | Pandit | H04N 19/597 375/240.12 |
| 2011/0176615 A1 | 7/2011 | Lee et al. | |
| 2012/0189058 A1 | 7/2012 | Chen et al. | |
| 2013/0272402 A1* | 10/2013 | Tu | H04N 19/52 375/240.13 |
| 2013/0272411 A1* | 10/2013 | Tu | H04N 19/105 375/240.16 |
| 2013/0272412 A1* | 10/2013 | Seregin | H04N 19/00763 375/240.16 |
| 2013/0315308 A1* | 11/2013 | Sugio | H04N 19/597 375/240.14 |
| 2013/0342644 A1* | 12/2013 | Rusanovskyy | H04N 19/597 348/43 |
| 2015/0237365 A1 | 8/2015 | Takahashi | |

OTHER PUBLICATIONS

Bross et al., "High Efficiency Video Coding (HEVC) Text Specification Draft 10 (for FDIS & Consent)", JCTVC-L1003, Joint Collaborative Team on Video Coding (JCT-VC) of ITU-T SG 16 WP 3 and ISO/IEC JTC 1/SC 29/WG 11, 12th Meeting: Geneva, CH, Jan. 14-23, 2013, 321 pages.
Chen et al., "SHVC Test Model 1 (SHM 1)", Joint Collaborative Team on Video Coding (JCT-VC) of ITU-T SG16 WP3 and ISO/IEC JTC1/SC29/WG11, 12th Meeting: Geneva, CH, JCTVC-L1007, Jan. 14-23, 2013, 41 pages.
Dong et al., "Description of Scalable Video Coding Technology Proposal by InterDigital Communications", JCTVC-K0034, Joint Collaborative Team on Video Coding (JCT-VC) of ITU-T SG16 WP3 and ISO/IEC JTC1/SC29/WG11, 11th Meeting: Shanghai, CN, Oct. 10-19, 2012, pp. 1-30.
ISO/IEC, "Information Technology—Generic Coding of Moving Pictures and Associated Audio Information: Video", ISO/IEC 13818-2, Dec. 2000, 220 pages.
ISO/IEC, "Joint Call for Proposals on Scalable Video Coding Extensions of High Efficiency Video Coding (HEVC)", ISO/IEC JTC 1/SC 29/WG 11 and ITU-T SG 16 WP 3, ISO/IEC JTC1/SC29/WG11 N12957, Stockholm, Sweden, Jul. 2012, pp. 1-11.
ITUT-T, "Advanced Video Coding for Generic Audiovisual Services", Series H: Audiovisual and Multimedia Systems, Infrastructure of Audiovisual Services—Coding of Moving Video, ITU-T Rec H.264, Nov. 2007, 563 pages.
Kim et al., "Restricted Usage of Motion Vectors for Long-Term Reference Picture in Motion Vector Prediction Process", Samsung Electronics Co., Ltd., Document: JCTVC-J0302, Joint Collaborative Team on Video Coding (JCT-VC) of ITU-T SG 16 WP 3 and ISO/IEC JTC 1/SC 29/WG 11, 10th Meeting: Stockholm, SE, Jul. 11-20, 2012, pp. 1-14.
Lim et al., "High-Level Syntax: MVP Scaling Issue for LTRPs", Document: JCTVC-I0422, Joint Collaborative Team on Video coding (JCT-VC) of ITU-T SG 16 WP 3 and ISO/IEC JTC 1/SC 29/WG 11, 9th Meeting: Geneva, CH, Apr. 27-May 7, 2012, pp. 1-2.
Luthra, Ajay, "Draft Use Cases for the Scalable Enhancement of HEVC (V1)", WG11 AHG on Study of HEVC Extensions, ISO/IEC JTC1/SC29/WG11 M22558, Geneva, Switzerland, Nov. 2011, 8 pages.
Misra et al., "Description of Scalable Video Coding Technology Proposal by Sharp (Proposal 1)", Document: JCTVC-K0031, Joint Collaborative Team on Video Coding (JCT-VC) of ITU-T SG16 WP3 and ISO/IEC JTC1/SC29/WG11, 11th Meeting: Shanghai, CN, Oct. 10-19, 2012, pp. 1-36.
Nakamura et al., "Non-CE13: Multiple-Scaled Merging Candidates", JVC Kenwood Corporation, Document: JCTVC-G224, Joint Collaborative Team on Video Coding (JCT-VC) of ITU-T SG16 WP3 and ISO/IEC JTC1/SC29/WG11, 7th Meeting: Geneva, CH, Nov. 21-30, 2011, pp. 1-13.
Ohm, Jens-Rainer, "Advances in Scalable Video Coding", Proceedings of the IEEE, vol. 93, No. 1, Jan. 2005, pp. 42-56.
Schwarz et al., "Overview of the Scalable Video Coding Extension of the H.264/AVC Standard", IEEE Transactions on Circuits and Systems for Video Technology, vol. 17, No. 9, Sep. 2007, pp. 1-18.
Sugio et al., "Parsing Robustness for Merge/AMVP", Panasonic Corporation, Document: JCTVC-F470, WG11 No. m20900, Joint Collaborative Team on Video Coding (JCT-VC) of ITU-T SG16 WP3 and ISO/IEC JTC1/SC29/WG11, 6th Meeting: Torino, IT, Jul. 14-22, 2011, pp. 1-31.
Sullivan et al., "Meeting Report of the 11th Meeting of the Joint Collaborative Team on Video Coding (JCT-VC)", Document: JCTVC-K_Notes_d1, Joint Collaborative Team on Video Coding (JCT-VC) of ITU-T SG16 WP3 and ISO/IEC JTC1/SC29/WG11, 11th Meeting: Shanghai, CN, Oct. 10-19, 2012, pp. 1-66.
Tagliasacchi et al., "A Distributed Source Coding Based Robust Spatio-Temporal Scalable Video Codec", Proc. Picture Coding Symposium, Dec. 15, 2004, 6 pages.
Kim et al., "HM9: High Efficiency Video Coding (HEVC) Test Model 9 Encoder Description", JCT-VC Video Subgroup, MPEG 2012/N13154, Shanghai, China, Oct. 2012, 36 pages.
Xiu et al., "Improved Temporal Motion Vector Prediction for Reference Index Based SHVC", InterDigital Communications, Inc., JCTVC-M0192, 13th Meeting: Incheon, KR, Apr. 18-26, 2013, 15 pages.
Zhang et al., "3D-CE4: Advanced Residual Prediction for Multiview Coding", Qualcomm Incorporated, JCT3V-C0049, 3rd Meeting: Geneva, CH, Jan. 17-23, 2013, 6 pages.
Zhang et al., "3D-CE5.h: Merge Candidates Derivation from Disparity Vector" Qualcomm Incorporated, JCT3V-B0048, 2nd Meeting: Shanghai, CN, Oct. 13-19, 2012, 4 pages.

\* cited by examiner

| seq_parameter_set_rbsp() { | Descriptor |
|---|---|
| sps_video_parameter_set_id | u(4) |
| sps_max_sub_layers_minus1 | u(3) |
| sps_temporal_id_nesting_flag | u(1) |
| ... | |
| if( nuh_layer_id > 0 ) | |
| { | |
| sps_tmvp_merge_modified_flag | u(1) |
| sps_tmvp_non_merge_modified_flag | u(1) |
| } | |
| ... | |

FIG. 15

| slice_segment_header( ) { | Descriptor |
|---|---|
| first_slice_segment_in_pic_flag | u(1) |
| if( nal_unit_type >= BLA_W_LP&&nal_unit_type <= RSV_IRAP_VCL23 ) | |
| no_output_of_prior_pics_flag | u(1) |
| ... | |
| if( slice_segment_header_extension_present_flag ) { | |
| if( nuh_layer_id > 0 ) | |
| { | |
| slice_tmvp_merge_modified_flag | u(1) |
| slice_tmvp_non_merge_modified_flag | u(1) |
| } | |
| ... | |
| } | |

FIG. 16

ENHANCED TEMPORAL MOTION VECTOR PREDICTION FOR SCALABLE VIDEO CODING

CROSS REFERENCE TO RELATED APPLICATIONS

This application is the National Stage Entry under 35 U.S.C. § 371 of Patent Cooperation Treaty Application No. PCT/US2014/032605, filed Apr. 2, 2014, which claims the benefit of U.S. Provisional Patent Application No. 61/807,639 filed on Apr. 2, 2013, the contents of which are hereby incorporated by reference herein.

BACKGROUND

Video coding systems are often used to compress digital video signals, for instance to reduce storage space consumed and/or to reduce transmission bandwidth consumption associated with such signals. For example, block-based hybrid video coding systems are widely deployed and frequently used.

Scalability may be implemented in scalable video coding systems, such as high efficiency video coding (HEVC), for example. Scalability may enable the transmission and/or decoding of one or more partial bit streams and may provide video services with lower temporal and/or spatial resolutions, and/or with reduced fidelity, while retaining a reconstruction quality that may be substantially high relative to a rate of the partial bit streams.

However, the performance of processes of known scalable video coding systems, for example the generation of temporal motion vector predictors and/or reference list selection, may exhibit inefficiencies.

SUMMARY

In enhancement layer (EL) coding, the temporal candidate(s) may be derived in the merge mode and the non-merge mode. Selection of the reference index of a current prediction unit (PU) and of the reference list of a co-located PU may be considered jointly when constructing the temporal candidate of EL. The selection(s) may be made such that a motion vector (MV) scaling operation may be avoided. As used herein, coding may include encoding and decoding. A selected motion vector prediction candidate may be added to a merging candidate list in a position before that of a spatial MV prediction candidate. A selected MV prediction candidate may be added to the merging candidate list in place of a spatial motion vector prediction candidate. The temporal candidate(s) may be placed in the candidate list of the EL video coding. In the EL merge mode, the temporal candidate may be placed prior to the spatial candidates. In the EL non-merge mode, the temporal candidate may be included in the candidate list of the EL video coding.

The reference list of a co-located PU may be selected based on whether a motion vector scaling operation may be associated with using a particular candidate reference picture list as a motion vector prediction reference picture list associated with the co-located PU. For example, the candidate reference picture lists associated with the co-located PU and a reference picture list associated with a current PU may be obtained. The candidate reference picture lists may be examined to determine whether motion vector scaling operation(s) may be associated with using a particular candidate reference picture list as the motion vector prediction reference picture list associated with the co-located PU, and the motion vector prediction reference picture list may be selected from the candidate reference picture lists based on the examination.

Given a candidate reference picture list, it may be determined that a motion vector scaling operation may not be associated with using the candidate reference picture list as the motion vector prediction reference picture list associated with the co-located PU on a condition that the reference pictures in the reference picture list associated with the current PU have the same picture order count (POC) values as the reference pictures in candidate reference picture list associated with a co-located PU. It may be determined that a motion vector scaling operation may not be associated with using the candidate reference picture list as the motion vector prediction reference picture list associated with the co-located PU on a condition that the candidate reference picture list has a same reference list index as the reference picture list associated with the current PU. It may be determined that a motion vector scaling operation may not be associated with using the candidate reference picture list as the motion vector prediction reference picture list associated with the co-located PU on a condition that the candidate reference picture list includes a reference picture having a same POC distance from the picture associated with the co-located PU as the POC distance between the picture associated with the current PU and a reference picture in the reference picture list associated with the current PU. Based on a determination that a motion vector scaling operation may be associated with using the candidate reference picture list as the motion vector prediction reference picture list associated with the co-located PU, another candidate reference picture list may be considered.

The reference index of a current PU may be selected based on whether a motion vector scaling operation may be associated with using a particular reference picture in the reference picture list as a motion vector prediction candidate for the current PU. For example, the reference pictures in the reference picture list associated with the current PU may be examined to determine whether motion vector scaling operation(s) may be associated with using a particular reference picture as the motion vector prediction candidate for performing motion vector prediction. A motion vector prediction candidate may be selected from the reference pictures in the reference picture list based on the examination. For example, a reference picture may be selected as the vector prediction candidate based on a determination that a motion vector scaling operation may not be associated with using the reference picture as the motion vector prediction candidate for performing motion vector prediction.

For a given reference picture in the reference picture list of the current PU, if the reference picture has a same POC value as a reference picture of the co-located PU, it may be determined that a motion vector scaling operation may not be associated be with using the reference picture as the motion vector prediction candidate for performing motion vector prediction. If the reference picture has a same POC distance from the picture associated with the current PU as the POC distance between the picture associated with the co-located PU and a reference picture of the co-located PU, it may be determined that a motion vector scaling operation may not be associated be with using the reference picture as the motion vector prediction candidate for performing motion vector prediction. Another reference picture from the reference picture list associated with the current PU for the motion vector prediction candidate based on a determination that a motion vector scaling operation may be associated with using the reference picture as motion vector prediction candidate for performing motion vector prediction.

A method of video coding may include obtaining a reference picture list associated with a current PU, the reference picture comprising a target reference picture; obtaining a plurality of candidate reference picture lists associated with a co-located PU that is co-located with the current PU; and selecting a motion vector prediction reference picture list associated with a co-located PU from the plurality of candidate reference picture lists based on a picture order count (POC) associated with the target reference picture. For example, a candidate reference picture list that comprises a reference picture having a same POC value as the target reference picture may be selected as the motion vector prediction reference picture list. For example, a candidate reference picture list that comprises a reference picture having a same POC distance from the picture associated with the co-located PU as the POC distance between the target reference picture and the picture associated with the current PU may be selected as the motion vector prediction reference picture list.

The candidate reference picture lists may include a first candidate reference picture list and a second candidate reference picture list. For example, whether the first candidate reference picture list comprises a reference picture having a same POC value as the target reference picture may be determined. The motion vector prediction reference picture list may be selected based on the determining. The first candidate reference picture list may be selected on a condition that the first candidate reference picture list comprises the reference picture having the same POC value as the target reference picture, and the second candidate reference picture list may be considered for the selecting on a condition that the first candidate reference picture list does not comprise the reference picture having the same POC value as the target reference picture. For example, whether the first candidate reference picture list comprises a reference picture having a same POC distance from the picture associated with the co-located PU as the POC distance between the target reference picture and the picture associated with the current PU may be determined. The motion vector prediction reference picture list may be selected based on the determining. The first candidate reference picture list may be selected on a condition that the first candidate reference picture list comprises the reference picture having the same POC distance from the picture associated with the co-located PU as the POC distance between the target reference picture and the picture associated with the current PU, and the second candidate reference picture list may be considered for the selecting on a condition that the first candidate reference picture list does not comprise the reference picture having same POC distance from the picture associated with the co-located PU as the POC distance between the target reference picture and the picture associated with the current PU. A default candidate reference picture list may be selected on a condition that the candidate reference picture lists do not comprise the reference picture having the same POC distance from the picture associated with the co-located PU as the POC distance between the target reference picture and the picture associated with the current PU.

The reference picture list associated with the current PU may include a plurality of reference pictures. The method of video coding may include selecting a motion vector prediction candidate from the reference picture list associated with the current PU based on a POC associated with a reference picture of the co-located PU; and performing motion vector prediction based on the selected motion vector prediction candidate. For example, a reference picture having a same POC value as the reference picture of the co-located PU may be selected as the motion vector prediction candidate. For example, a reference picture having a same POC distance from the picture associated with the current PU as the POC distance between the reference picture of the co-located PU and the picture associated with the co-located PU may be selected as the motion vector prediction candidate.

A first reference picture may be retrieved from the reference picture list associated with the current PU. A first POC distance between the reference picture and the picture associated with the current PU and a second POC distance between the reference picture of the co-located PU and the picture associated with the co-located PU may be calculated. The motion vector prediction candidate for motion vector prediction may be selected based on a comparing of the first and the second POC distances. For example, the first reference picture may be selected as the motion vector prediction candidate on a condition that the first POC distance equals to the second POC distance. The first POC distance between the first reference picture and the current PU may include a difference between a POC value associated with the reference picture and a POC value associated with a current picture associated with the current PU.

A method of video coding may include: obtaining a reference picture list associated with a current PU, the reference picture list comprises a plurality of reference pictures; and selecting a motion vector prediction candidate from the reference picture list based on a picture order count (POC) associated with a reference picture of a co-located PU that is co-located with the current PU; and performing motion vector prediction based on the selected motion vector prediction candidate. For example, a reference picture having a same POC value as the reference picture of the co-located PU may be selected as the motion vector prediction candidate.

BRIEF DESCRIPTION OF THE DRAWINGS

FIG. 15 is a table that depicts an example sequence parameter set syntax.

FIG. 16 is a table that depicts example slice header syntax.

DETAILED DESCRIPTION

Figure 1:
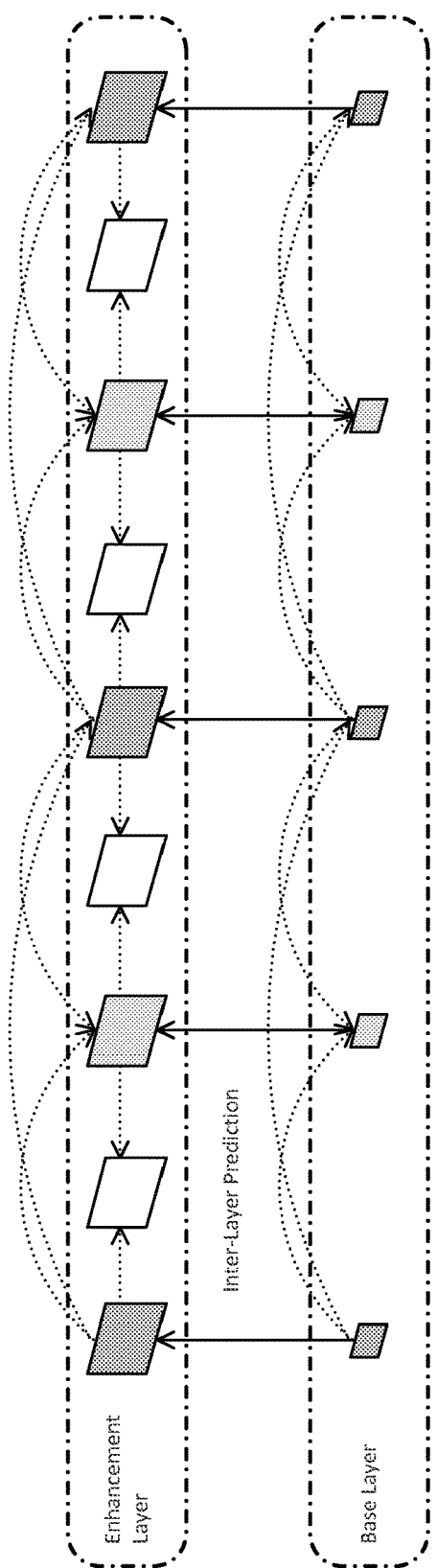
FIG. 1 depicts an example scalable video coding inter-layer prediction mechanism.

FIG. 1 illustrates an example scalable video coding inter-layer prediction (ILP) mechanism having two layers, including a base layer (BL) and an enhancement layer (EL). As used herein, the BL may include lowest layer of a video stream, a layer lower than the enhancement layer, and/or the like. The base layer and the enhancement layer may represent two adjacent spatial scalable layers having different resolutions. The base layer may include pictures have lower resolution than the pictures in the enhancement layer. Such an inter-layer prediction mechanism may improve the efficiency of a scalable video coding system. Such a mechanism may be applied to multiple layers of a scalable video coding structure. Within one or both of the base or enhancement layers, motion-compensated prediction and/or intra-prediction may be employed (represented by dotted lines in FIG. 1), for example as in a standard H.264 encoder. Inter-layer prediction may utilize base layer information, such as spatial texture, motion vector predictors, reference picture indices, and/or residual signals, for example to improve a coding efficiency of the enhancement layer. When decoding a given enhancement layer, a scalable video coding system may not fully reconstruct reference pictures from one or more lower layers (e.g., dependent layers of a current layer).

Figure 2:
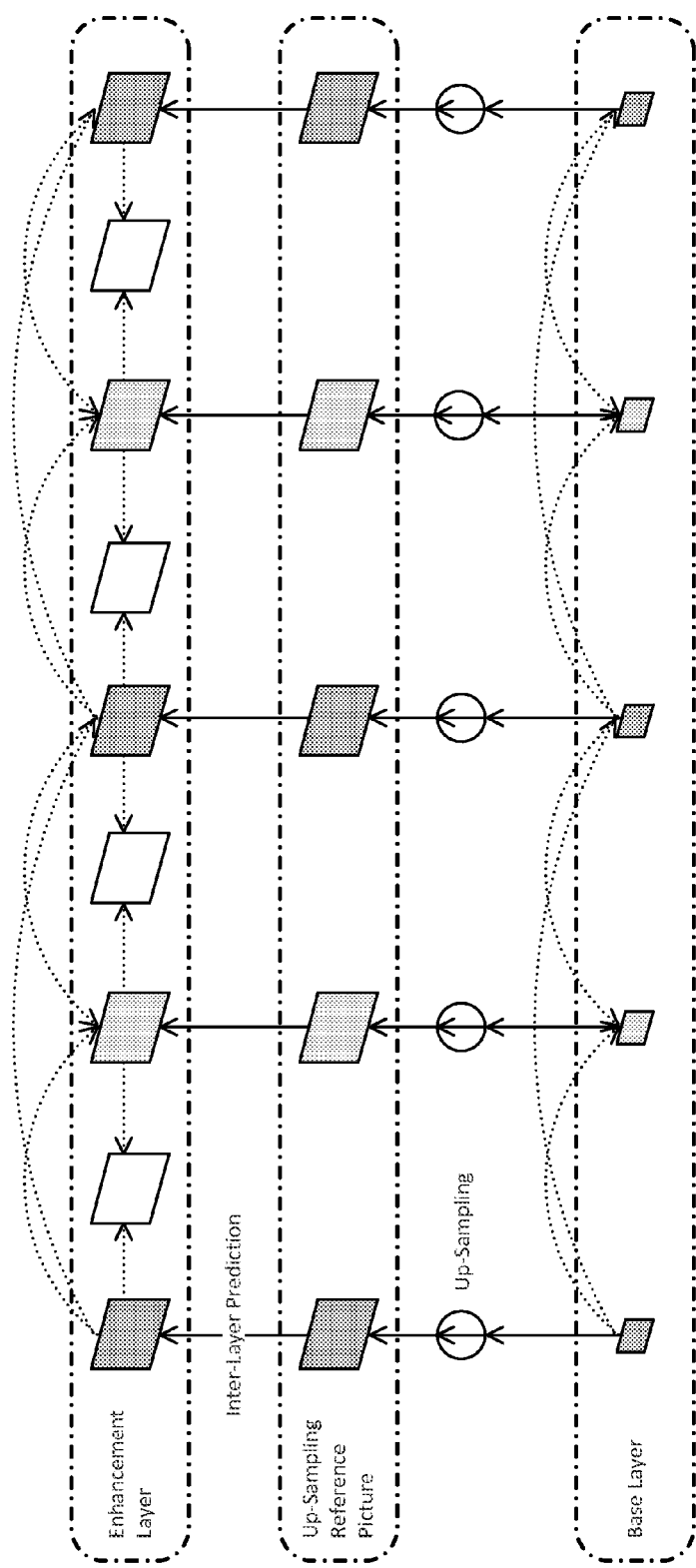
FIG. 2 depicts an example scalable video coding inter-layer prediction mechanism.

FIG. 2 depicts an example scalable video coding inter-layer prediction mechanism. As shown in FIG. 2, BL pictures may be up-sampled to match the video spatial resolution of the EL. One or more up-sampled inter layer reference (ILR) pictures may be used as reference pictures, for example to predict the EL video. The prediction of EL video may be formed, for example, by motion-compensated prediction from the up-sampled BL signal, by temporal prediction within an EL signal (e.g., a current EL signal), and/or by averaging such up-sampled BL signal with a temporal EL prediction signal. In accordance with this approach, one or more lower layer pictures may be reconstructed (e.g., fully reconstructed). Such a mechanism may be deployed for video coding scalable coding with more than two layers.

Figure 3:
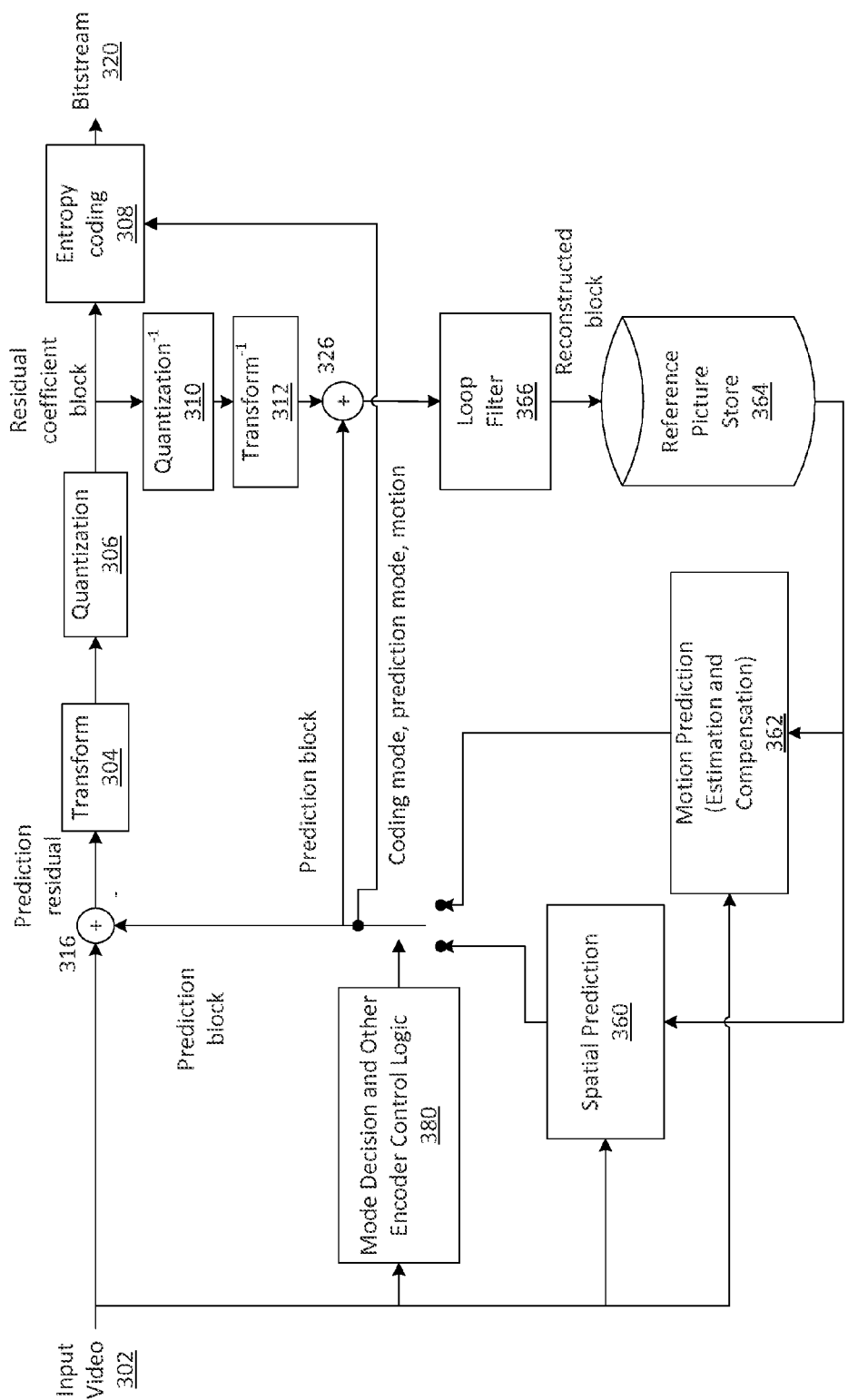
FIG. 3 depicts operation of an example hybrid, single-layer video encoder.

FIG. 3 is a block diagram illustrating an example of a block-based video encoder, for example, a hybrid video encoding system. The encoder may be a single-layer encoder. The encoder may employ spatial prediction (which may be referred to as intra prediction) and/or temporal prediction (which may be referred to as inter prediction and/or motion compensated prediction) to predict an input video signal. The encoder may include mode decision logics that may choose a form of prediction based on criterion such as a combination of rate and/or distortion considerations. The encoder may transform and/or quantize a prediction residual (e.g., a difference signal between the input signal and the prediction signal). The quantized residual, together with the mode information (e.g., intra or inter prediction, motion information, prediction modes, etc.) may be further compressed at the entropy coder and may be packed into the output bit stream. For the EL video, the EL encoder may operate in a manner that is substantially similar to the BL encoder. An EL decoded picture buffer (EL DPB) that may provide reference pictures for prediction of the EL video may include EL reference pictures, and/or may include ILR pictures generated from the DPB of a dependent layer (e.g., pictures in a BL DPB).

As shown, an input video signal 302 may be processed block by block. The video block unit may include 16×16 pixels. Such a block unit may be referred to as a macroblock (MB). In High Efficiency Video Coding (HEVC), extended block sizes (e.g., which may be referred to as a "coding unit" or CU) may be used to efficiently compress high resolution (e.g., 1080 p and beyond) video signals. In HEVC, a CU may be up to 64×64 pixels. A CU may be partitioned into prediction units (PUs), for which separate prediction methods may be applied.

For an input video block (e.g., a MB or a CU), spatial prediction 360 and/or temporal prediction 362 may be performed. Spatial prediction (e.g., "intra prediction") may use pixels from already coded neighboring blocks in the same video picture/slice to predict the current video block. Spatial prediction may reduce spatial redundancy inherent in the video signal. Temporal prediction (e.g., "inter prediction" or "motion compensated prediction") may use pixels from already coded video pictures (e.g., which may be referred to as "reference pictures") to predict the current video block. Temporal prediction may reduce temporal redundancy inherent in the video signal. A temporal prediction signal for a video block may be signaled by one or more motion vectors, which may indicate the amount and/or the direction of motion between the current block and its prediction block in the reference picture. If multiple reference pictures are supported (e.g., as may be the case for H.264/AVC and/or HEVC), for each video block, its reference picture index may be sent additionally. The reference index may be used to identify from which reference picture in the reference picture store 364 (e.g., which may be referred to as a "decoded picture buffer" or DPB) the temporal prediction signal comes.

After spatial and/or temporal prediction, the mode decision block 380 in the encoder may select a prediction mode. The prediction block may be subtracted from the current video block 316. The prediction residual may be transformed at 304 and/or quantized at 306. The quantized residual coefficients may be inverse quantized at 310 and/or inverse transformed at 312 to form the reconstructed residual, which may be added back to the prediction block 326 to form the reconstructed video block.

In-loop filtering such as, but not limited to a deblocking filter, a Sample Adaptive Offset, and/or Adaptive Loop Filters may be applied at 366 on the reconstructed video block before it is put in the reference picture store 364 and/or used to code future video blocks. To form the output video bitstream 320, a coding mode (e.g., inter prediction mode or intra prediction mode), prediction mode information, motion information, and/or quantized residual coefficients may be sent to the entropy coding unit 308 to be compressed and/or packed to form the bitstream.

Figure 4:
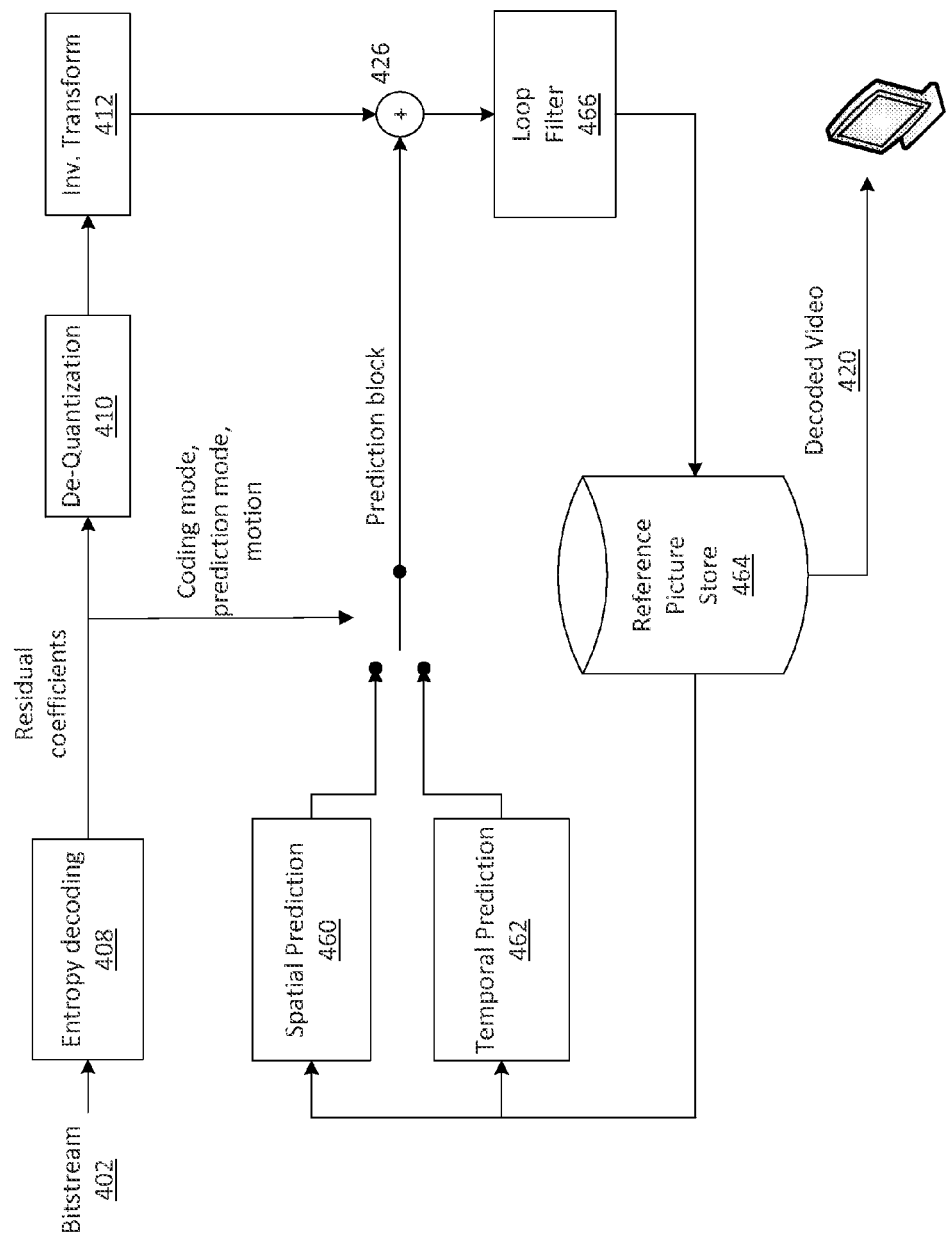
FIG. 4 depicts operation of an example hybrid, single-layer video decoder.

FIG. 4 is a block diagram illustrating an example of a block-based video decoder. The decoder may receive the bit stream produced by the encoder depicted in FIG. 3, for example, and may reconstruct a video signal to be displayed. At the video decoder, the bit stream may be parsed by an entropy decoder. One or more residual coefficients may be inverse quantized and/or inverse transformed, for example to obtain a reconstructed residual. Coding mode and/or prediction information may be used to obtain a prediction signal using spatial prediction anchor temporal prediction, for example. The prediction signal and the reconstructed residual may be added together to obtain the reconstructed video. The reconstructed video may be processed through loop filtering, for example, before being stored in the DPB to be displayed and/or to be used to predict one or more future video signals.

A video bitstream 402 may be unpacked and/or entropy decoded at entropy decoding unit 408. The coding mode and/or prediction information may be sent to the spatial prediction unit 460 (e.g., if intra coded) and/or the temporal prediction unit 462 (e.g., if inter coded) to form the prediction block. If inter coded, the prediction information may comprise prediction block sizes, one or more motion vectors (e.g., which may indicate direction and amount of motion), and/or one or more reference indices (e.g., which may indicate from which reference picture the prediction signal is to be obtained).

Motion compensated prediction may be applied by the temporal PU 462 to form the temporal prediction block. The residual transform coefficients may be sent to inverse quantization unit 410 and inverse transform unit 412 to reconstruct the residual block. The prediction block and the residual block may be added together at 426. The reconstructed block may go through in-loop filtering before it is stored in reference picture store 464. The reconstructed video in the reference picture store 464 may be used to drive a display device and/or used to predict future video blocks. The decoded video 420 may be displayed on a display.

A single layer video encoder may take a single video sequence input and generate a single compressed bit stream transmitted to the single layer decoder. A video codec may be designed for digital video services (e.g., such as but not limited to sending TV signals over satellite, cable and terrestrial transmission channels). With video centric applications deployed in heterogeneous environments, multi-layer video coding technologies may be developed as an extension of the video coding standards to enable various applications. For example, scalable video coding technologies may be designed to handle more than one video layer where each layer may be decoded to reconstruct a video signal of a particular spatial resolution, temporal resolution, fidelity, and/or view. Although a single layer encoder and decoder are described with reference to FIG. 3 and FIG. 4, the concepts described herein may utilize a multi-layer encoder and decoder, for example, for multi-layer or scalable coding technologies. The encoder and/or decoder of FIGS. 3 and 4 may perform any of the functions described herein. For example, the encoder and/or decoder of FIGS. 3 and 4 may perform temporal motion vector prediction (TMVP) on an enhancement layer (e.g., an enhancement layer picture) using a MV of an enhancement layer PU.

As shown in FIGS. 3 and 4, for example, motion compensated prediction may exploit the redundancy between pictures. In motion compensated prediction, for an inter-coded block, motion information may be used to trace corresponding matching block(s) in one or more reference pictures for each inter-coded block. In an embodiment, motion information may be used to trace corresponding matching block(s) in one or more reference pictures for each inter-coded block. Inter-coded block may be referred to as prediction units (PUs). Motion information may include one or more motion vectors (MVs) describing the horizontal and/or vertical displacement between a current PU and its matching block. An MV may correspond to one reference picture index. Motion information may include one or two reference picture indices. In case of B slices, motion information may include an identification of which reference picture list is associated with each reference index.

A scalable video coding system (e.g., an HEVC-compliant system) may include two modes to code the motion information of PUs (e.g., each PU), such as a merge mode and a non-merge mode. Such use of two modes may reduce the overhead used for representing motion information in the bit stream. In the merge mode, the motion information of a PU may be derived (e.g., directly or indirectly) from spatial and temporal neighboring blocks. A competition based scheme may be applied to select a best neighboring block from among available candidates. The index of the best candidate may be sent for re-establishing the motion information of the PU at the decoder. If an inter-coded PU is coded in non-merge mode, the MV may be differentially coded, for example using a MV predictor derived using an advanced motion vector prediction (AMVP) technique. Use of an AMVP technique may allow the encoder to choose the MV predictor from spatial and temporal neighboring candidates. A difference between the MV predictor and the actual MV, and/or the index of the predictor, may be transmitted to the decoder.

The efficiency of scalable video coding, for both merge and non-merge modes, may be enhanced by improving the method of forming a temporal candidate. For example, the method of forming a temporal candidate may be improved for an underlying single-layer coding standard (e.g., known HEVC) and a scalable system with two spatial layers. Improved temporal candidate formation may be applied to other scalable coding systems that may use other types of underlying single-layer codecs, may have more than two layers, and/or that may support other types of scalabilities.

Figure 5:
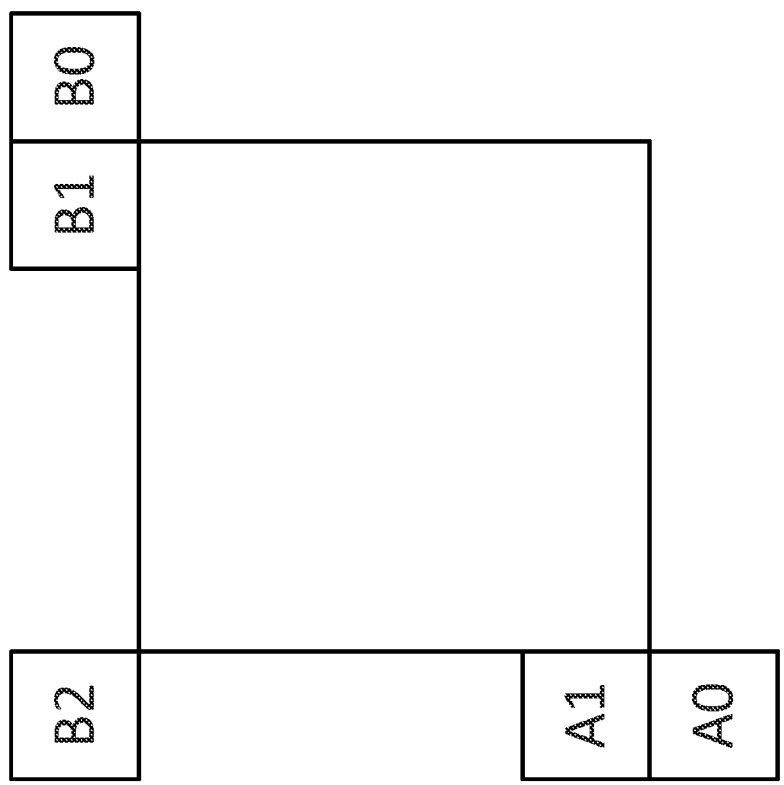
FIG. 5 depicts example positions of example spatial candidates of motion information.

In an example video coding system, a set of possible candidates in the merge mode may include one or more spatial neighboring candidates, one or more temporal neighboring candidates, and/or one or more generated candidates. FIG. 5 depicts the positions of an example of five spatial candidates of motion information. To construct the list of merge candidates, the five spatial candidates may be checked and may be added into the list, for example according to the order A1, B1, B0, A0 and B2. If the block located at a spatial position is intra-coded or outside the boundary of the current slice, it may be considered as unavailable. Redundant entries, for example where candidates have the same motion information, may be excluded from the list.

After inserting the valid spatial candidates into the merge candidate list, the temporal candidate may be generated from the motion information of the co-located block in the co-located reference picture, for example using a TMVP technique. The co-located reference picture may be signaled (e.g., explicitly or implicitly) in the bit stream, for example by sending its reference picture list and its reference picture index in the list. A maximum number of merge candidates N (e.g., a default of N=5) may be signaled, for example in a slice header. If the number of merge candidates (e.g., spatial and/or temporal candidates) is larger than N, the list may be limited to the first N−1 spatial candidate(s) and the temporal candidate. If the number of merge candidates is smaller than N, one or more combined candidates and/or zero motion candidates may be added to the candidate list, for example until the number reaches N. The combined candidates may be generated by combining the motion information of the spatial candidate and the temporal candidate For non-merge mode, an example video coding system may perform advanced motion vector prediction (AMVP), which may allow a present (e.g., current) PU to select its MV predictor from spatial and temporal candidates. In an embodiment, selection of spatial motion candidates may be limited to a maximum of two spatial motion candidates, among the five spatial candidates shown in FIG. 5, for example according to their availability. To illustrate, a first spatial candidate may be chosen from the set of left positions A1 and A0. A second spatial candidate may be chosen from the set of top positions B1, B0, and B2. Searching may be conducted in the same order as indicated in two sets. Addition to the candidate list may be limited to available and unique spatial candidates. When the number of available and unique spatial candidates is less than two, the temporal MV predictor candidate generated using the TMVP process may be added to the list. If the list still contains less than two candidates, a zero MV predictor may be added, for example repeatedly, until the number of MV predictor candidates is equal to two.

As used herein, a currPic may include the current picture being coded. A currPU may include current block/prediction unit being coded. The currPU may be part of the current picture being coded (e.g., encoded or decoded). A colPU may include the co-located block/PU. The colPU may be part of a picture that is co-located with the currPic. The picture that is co-located with the currPic may be referred to as a colPic. The colPic may be on a different layer than the currPic, and may be in time alignment with the currPic. A listCol may include the reference list associated with the co-located block/PU, e.g., a reference list associated with the co-located block/PU that may be selected for TMVP, a tentatively-selected/set reference list associated with the co-located block/PU. A listColDefault may include a default reference list of the co-located block. An LX may include the reference picture list associated with the current block/PU being coded, e.g., a predetermined reference picture list, a preset reference picture list, or the like. A refPicCol may include a reference picture in the tentatively-set reference list associated with the co-located block. A colPocDiff may include a POC distance from a reference picture in a reference list associated with the co-located block and the co-located reference picture. A colPocDiff may include a POC distance from the co-located reference picture to a reference picture in a reference list associated with the co-located block, e.g., the POC distance between the reference picture in the tentatively-set reference list associated with the co-located block and the co-located reference picture. A currPocDiff may include a POC distance from a reference picture in the reference picture list associated with the current block to the current picture being coded, or a POC distance from the current picture being coded to a reference picture in the reference picture list associated with the current block, e.g., the POC distance between a reference picture in the reference picture list and the current picture being coded. A refPic may include a reference picture in the reference picture list associated with the current block/PU being coded. A refIdxLX may include an index of the reference picture in the reference picture list associated with the current block/PU being coded.

Figure 6:
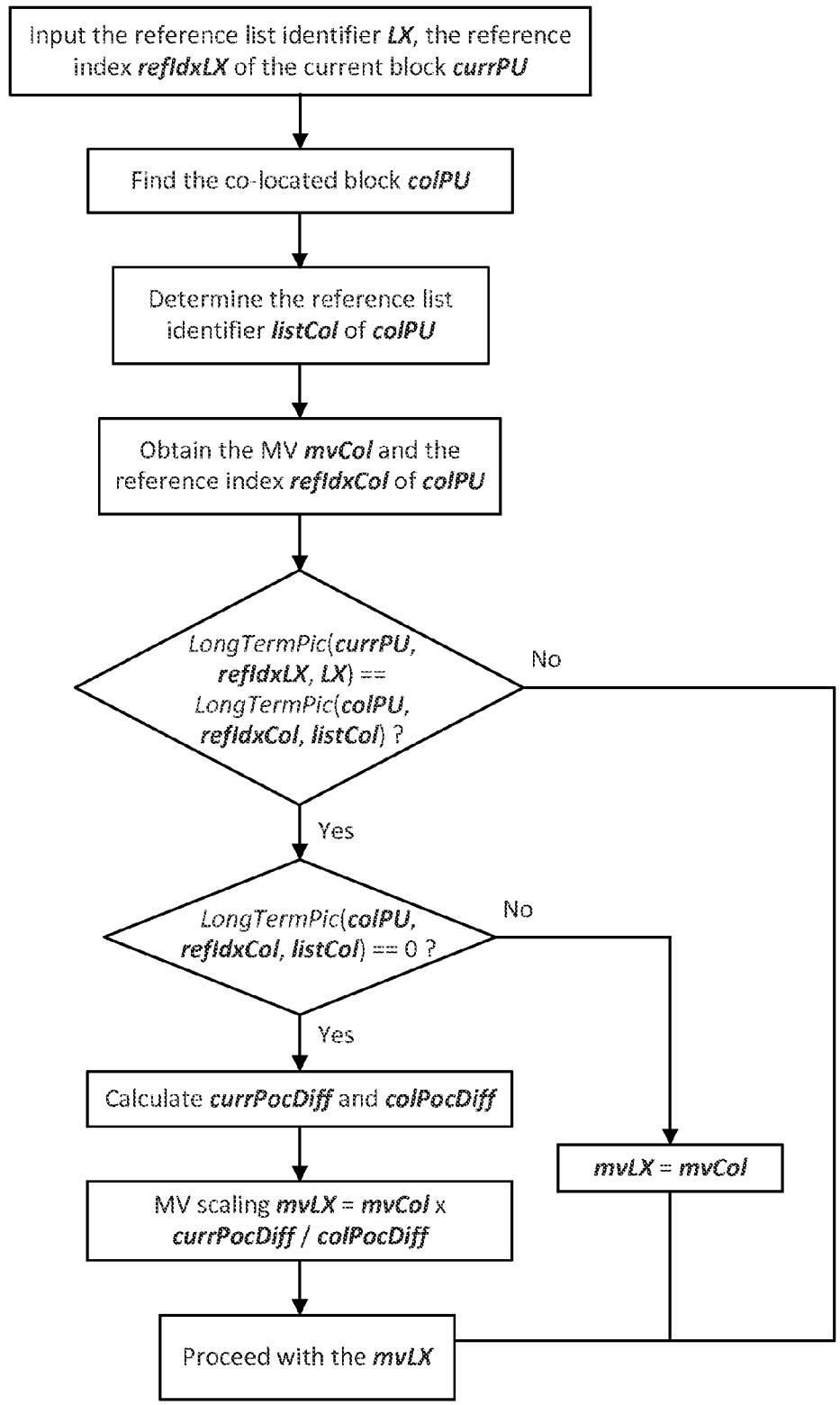
FIG. 6 is a flowchart that depicts an example process of temporal motion vector prediction.

FIG. 6 depicts an example TMVP process that may be used to generate the temporal candidate for merge mode and/or non-merge mode. Given an input reference list such as LX and a reference index such as refIdxLX (e.g., X being 0 or 1) of the current PU currPU, the co-located block colPU may be identified by checking the availability of the right-bottom block just outside the region of currPU in the co-located reference picture. If the right-bottom block is unavailable, the block at the center position of currPU in the co-located reference picture may be used.

The reference list listCol may include one or more reference pictures. The reference pictures may be referred to via the reference index refIdxLX.

The reference list listCol of the colPU may be determined, for example based on the picture order count (POC) of the reference pictures of the current picture. The reference list of the current picture may be used to locate the co-located reference picture. For example, the reference list listCol may be used to retrieve the corresponding MV such as mvCol and the reference index associated with the co-located PU such as the refIdxCol of colPU. The long and/or short term characteristic of the reference picture of currPU (e.g., indicated by refIdxLX) may be compared to long and/or short term characteristic of the reference picture of colPU (indicated by refIdxCol). If one of two reference pictures is a long term picture while the other is a short term picture, the temporal candidate may be considered as unavailable. For example, the temporal candidate may be considered as unavailable due to a large POC distance difference between mvCol and the predicted MV mvLX. If both of the two reference pictures are long term pictures, then mvLX may be set (e.g., directly set) to be mvCol. If both of the two reference pictures are short term pictures, mvLX may be set to be a scaled version of mvCol.

As shown in FIG. 6, currPocDiff may be denoted as the POC difference between the current picture and the reference picture of currPU, and colPocDiff may be denoted as the POC difference between the co-located reference picture and the reference picture of colPU. Given currPocDiff and colPocDiff, the predicted MV mvLX of currPU may be calculated from mvCol. For example, the predicted MV may be calculated as follows:

$$mvLX = mvCol \times \frac{currPocDiff}{colPocDiff} \quad (1)$$

In the merge mode, the temporal candidate may come from the first reference picture in the reference picture list. For example, the reference index for the temporal candidate may be set equal to 0. The reference index for the temporal candidate refIdxLX may be equal to 0 such that the temporal merge candidate comes from the first reference picture in list LX.

The reference list listCol of colPU may be chosen based on the POCs of the reference pictures of the current picture currPic as well as the reference list refPicListCol of currPic that includes the co-located reference picture; refPicListCol may be signaled in the slice header.

Figure 7:
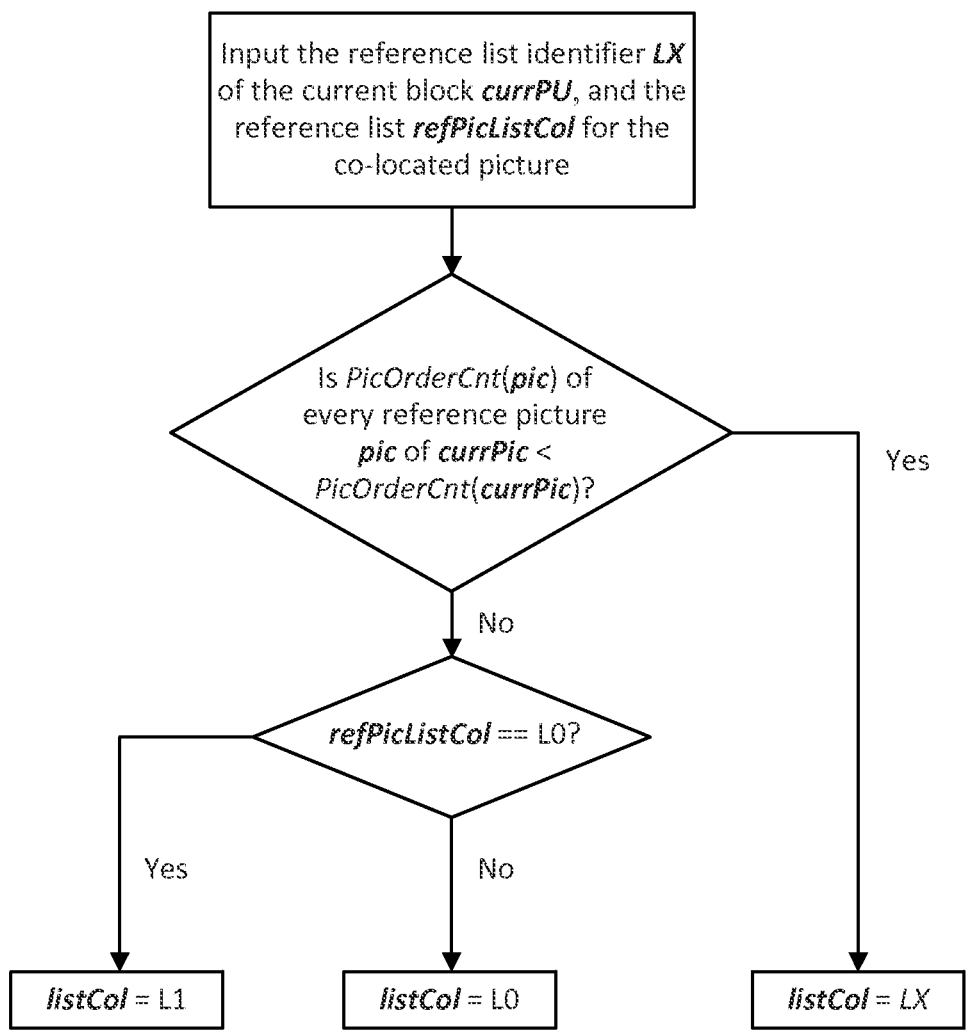
FIG. 7 is a flowchart that depicts example process of reference picture list selection of a co-located block.

FIG. 7 depicts an example process of selecting the list of reference pictures for the co-located PU such as listCol. If the POC number of every picture pic in the reference picture lists of currPic is less than or equal to the POC number of currPic, listCol may be set to equal to the input reference list LX (e.g., with X being 0 or 1). If at least one reference picture pic in at least one reference picture list of currPic has a greater POC number than the POC number of currPic, the list of reference pictures listCol may be set to a different reference list of the current picture refPicListCol of currPic. Motion field mapping techniques may be used to derive the motion field of the ILR picture. A reference index based SHVC solution may use the ILR picture as the co-located reference picture for TMVP derivation in the EL. Accordingly, refPicListCol may be set to equal to the reference list of the current picture that contains the ILR picture. If the ILR picture is included in both reference lists L0 and L1, refPicListCol may be set to L0.

In accordance with the example index based framework of scalable video coding (e.g., SHVC) depicted in FIG. 2, the ILR picture may be chosen as the co-located reference picture to derive the temporal candidate for both the merge mode and the non-merge mode.

For example, in merge mode, the reference index may be fixed to 0, and the corresponding EL reference picture may have different POC from that of the reference picture indicated by the reference index of the co-located block in the ILR picture. The MV scaling operation may be applied to the MV of the co-located block to calculate the predicted MV of the current PU. The scaling operation may reduce the MV predictor's accuracy and may lower a coding efficiency of the EL video. A reference list selection process, for example as depicted in FIG. 7, may not select the best reference list of the co-located block, which may result in an MV scaling operation when constructing the temporal candidate in EL merge mode that may be unnecessary.

Selection of the reference index of a current PU and the reference list of a co-located PU may be considered jointly when constructing the temporal candidate of EL for the merge mode, such that an MV scaling operation may be avoided. This may improve the accuracy of the predicted MV.

Figure 8:
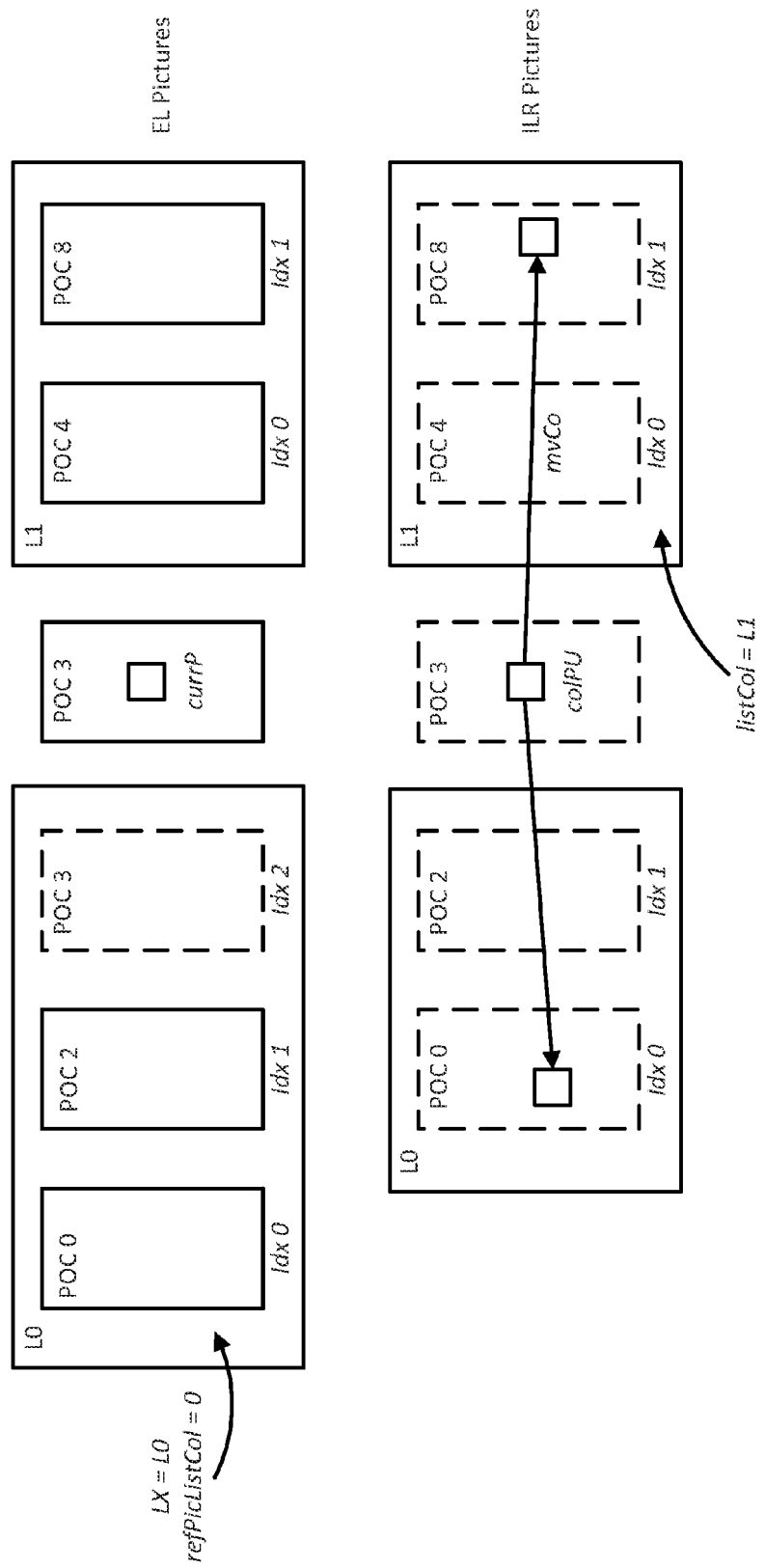
FIG. 8 depicts an example temporal motion vector predictor (TVMP) derivation process.

The reference list of the co-located block/PU may be selected in accordance with an input reference list of the current PU being coded, such as LX. FIG. 8 illustrates an example TMVP derivation process for EL merge mode. The illustrated TMVP derivation process may use bi-prediction, for example. In FIG. 8, the EL reference pictures are enclosed by solid lines and the ILR pictures are enclosed by dashed lines. It may be assumed that the input reference list of the temporal EL merge candidate LX is the first reference list. For example, let LX equal to L0. In accordance with the example TMVP process of merge mode depicted in FIG. 6, the input reference index refIdxLX may be set to 0.

For the current EL picture POC3, there may be two EL temporal reference pictures POC0 and POC2 and one ILR picture POC3 in the reference list L0, and two EL temporal reference pictures POC4 and POC8 in the reference list L1. As the ILR picture is used as the co-located reference picture for TMVP, the reference list used for the co-located picture of EL TMVP, e.g., refPicListCol, may be set equal to L0. In FIG. 8, there are two EL temporal reference pictures POC4 and POC8 that have the larger POCs than the current picture POC3. In accordance with the process depicted in FIG. 7, the reference list listCol of colPU may be equal to L1. As a result, it may not be possible to find two entries, one from the list LX of currPU and the other from the list listCol of colPU, respectively, that represent the same reference picture in the EL DPB. The MV of colPU, i.e., mvCol, may be scaled to generate the predicted MV mvLX of currPU.

The reference list of the co-located block may be adaptively selected, such that the MV scaling may be omitted during the TMVP derivation, for example, for EL merge mode. The reference list of a co-located PU may be selected based on whether a motion vector scaling operation may be associated with using a particular candidate reference picture list as a motion vector prediction reference picture list associated with the co-located PU. The candidate reference picture lists associated with the co-located PU may be obtained. For example, with reference to in FIG. 8, L0 and L1 may be obtained as the candidate reference picture lists associated with the co-located PU. L0 may be tentatively selected as the reference list of the co-located block colPU, listCol. Both the predicted MV mvLX of currPU and the MV mvCol of colPU may point to POC0. A reference picture list associated with the current PU may be obtained. For example, with reference to in FIG. 8, LX may be obtained as the reference picture list associated with the current PU. As shown, the reference list of the temporal EL merge candidate LX may be set to L0.

The candidate reference picture lists may be examined to determine whether motion vector scaling operation(s) may be associated with using a particular candidate reference picture list as the motion vector prediction reference picture list associated with the co-located PU, and the motion vector prediction reference picture list may be selected from the candidate reference picture lists based on the examination. When the MV scaling operation is bypassed for TMVP, the MV prediction accuracy of mvLX may be increased. A candidate reference picture list may be selected as the motion vector prediction reference picture list based on a determination that motion vector scaling operation(s) may not be associated with using the candidate reference picture list as a motion vector prediction reference picture list associated with the co-located PU.

The motion vector prediction reference picture list may be selected based on the POC distances. Given a candidate reference picture list, it may be determined that a motion vector scaling operation may not be associated with using the candidate reference picture fist as the motion vector prediction reference picture list associated with the co-located PU on a condition that the candidate reference picture list includes a reference picture having a same POC distance from the picture associated with the co-located PU as the POC distance between the picture associated with the current PU and a reference picture in the reference picture list associated with the current PU. If a reference picture in the reference picture list associated with the current PU that has the same POC distance from the picture associated with the current PU as the POC distance between a reference picture in the tentative-set reference list and the co-located reference picture is found, the tentative-set reference list may be selected as the reference list of the co-located block. The reference pictures in the reference lists associated with the co-located block may be examined, until a reference picture may be found in list LX of currPU whose POC distance to the current picture, e.g., currPocDiff, may be equal to colPocDiff. The reference pictures in the reference list may be derived from the reference list. For example, the selection process described with reference to FIG. 7 may be used. On a condition that the reference picture of the co-located block that satisfies the POC distance condition described herein may not be found, the reference list derived in accordance with the process depicted in FIG. 7 may be used.

Figure 9:
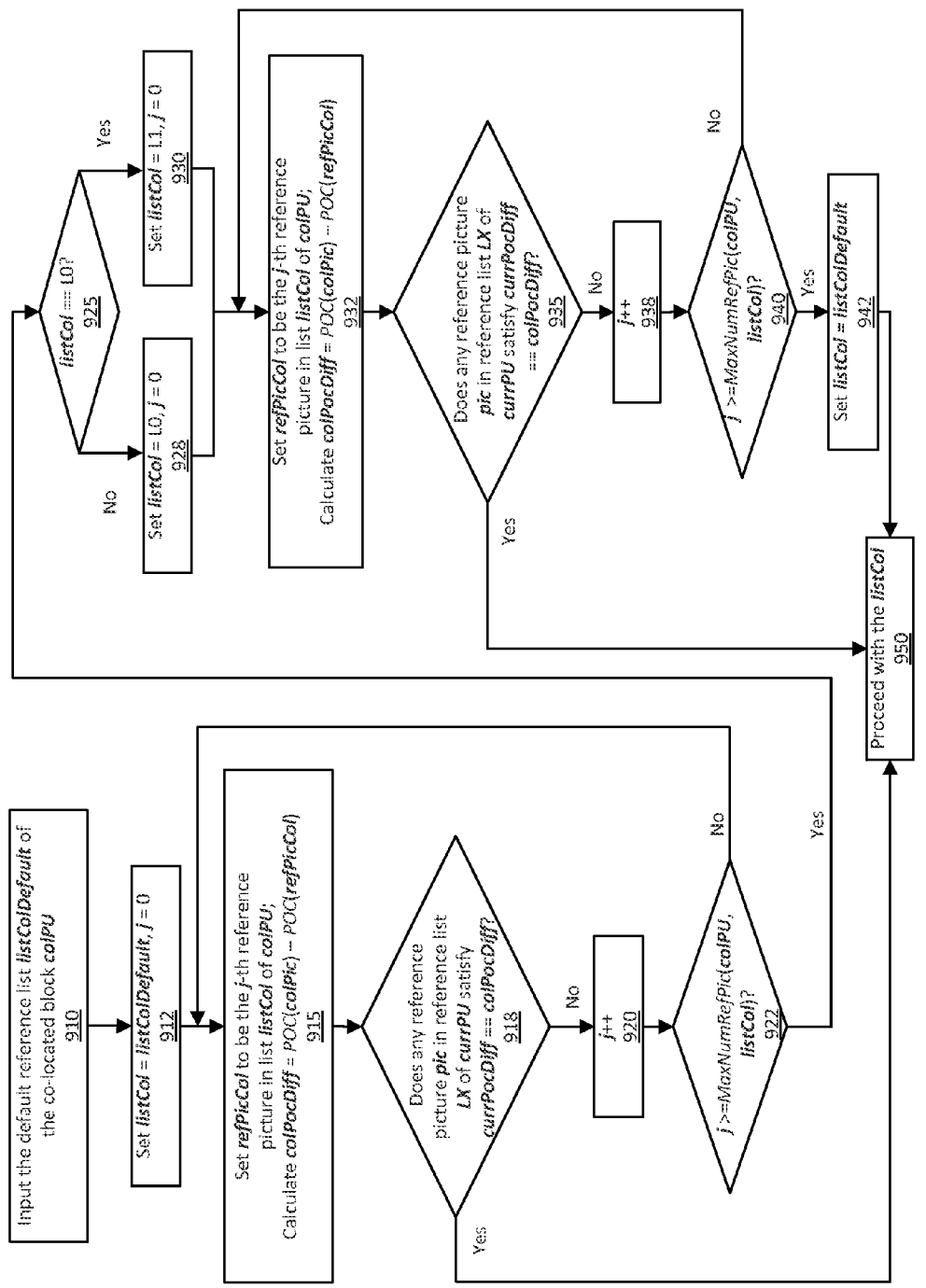
FIG. 9 is a flowchart that depicts an example process of reference list selection of a co-located block.

FIG. 9 depicts an example process of reference list selection for a co-located block. At 910, a default reference list listColDefault of the co-located block colPU may be obtained. The default reference list may be randomly determined, may be set to the first reference list, or may be determined based on a process described herein. At 912, the reference list of the co-located block colPU, listCol may be tentatively set to the default reference list listColDefault. An index such as j may be set to 0. At 915, a reference picture in the tentatively-set listCol, such as refPicCol may be obtained via the index j. For example, refPicCol may be set to the jth reference picture in the list listCol. The POC distance (e.g., difference in POC numbers, directional distance, and/or absolute distance) between the reference picture refPicCol and the co-located reference picture colPic may be calculated. The POC distance between the reference picture and the co-located reference picture may be referred to as colPocDiff.

At 918, the POC distance between the reference picture and the co-located reference picture may be compared to the POC distance between the reference picture(s) in the reference picture list LX of currPU and the co-located reference picture. The POC distance between a reference picture pic in the reference picture list LX of currPU and the current picture, such as currPocDiff, may be calculated. When there are more than one reference pictures in the reference picture list LX of currPU, the POC distances between the reference pictures and the current picture may be calculated. If one or more of the reference pictures in the reference list of the current PU has the same distance from the current picture as the colPocDiff, at 950, the current tentatively-set listCol may be selected as the reference list for the co-located block, and it may proceed to a next step with the listCol. At 920, the next reference picture in the reference list of the co-located block may be identified. For example, the index j may be incremented by one such that the jth reference picture in the list listCol may refer to the next reference picture.

At 922, it may be determined whether the reference pictures in the present tentatively-set reference list of the co-located block have been examined. If there are reference picture(s) in the present tentatively-set reference list of the co-located block that have yet to be examined, a next reference picture in the list may be examined at 915-922. If the reference pictures in the reference list of the co-located block have been examined, a next reference list associated with the co-located block have been considered. For example, the value of index j may be compared to the maximum number of reference pictures in the reference list of the co-located block. If the j is less than the maximum number of reference pictures in the reference list of the co-located block, steps 915-922 may be repeated such that the other reference pictures in the reference list of the co-located block may be examined. If j is greater than or equal to the maximum number of reference pictures in the reference list of the co-located block, at 925-930, the reference list of the co-located block colPU, listCol may be tentatively set to another reference list associated with the co-located block colPU.

Based on a determination that a motion vector scaling operation may be associated with using the candidate reference picture as the motion vector prediction reference picture list associated with the co-located PU, another candidate reference picture list associated with the colPU may be considered.

As shown in FIG. 9, at 925-930, the reference list of the co-located block may be tentatively set to another reference list associated with the co-located block. For example, there may be two reference lists associated with the co-located block, L0, and L1. At 925, it may be checked whether the present tentatively-set reference list listCol is L0. If not, the reference list listCol may be tentatively set to L0, at 928. If the present tentatively-set reference list listCol is L0, at 930 the reference list listCol may be tentatively set to the other reference list associated with the co-located block, L1. The index j may be reset to 0.

At 932-940, the reference pictures in the tentatively-set reference list may be examined, for example, as described herein with respect to 915-922. If a reference picture in the reference picture list associated with the current PU that has the same POC distance from the picture associated with the current PU as the POC distance between a reference picture in the tentative-set reference list and the co-located reference picture is found, the tentative-set reference list may be selected as the reference list of the co-located block.

If the reference pictures in the reference lists associated with the co-located block have been examined, and a reference picture in the reference picture list associated with the current PU that has the same POC distance from the picture associated with the current PU as the POC distance between the reference picture and the co-located reference picture has not been identified, the reference list of the co-located block may be set to the default reference list associated with the co-located block. For example, at 940, if it is determined that index j is greater than or equal to the maximum number of reference pictures in the reference list of the co-located block, the reference list of the co-located block colPU, listCol may be set to the default reference list associated with the co-located block colPU, listColDefault at 942. At 950, the process may proceed to a next step with the selected reference list of the co-located block listCol.

Given a candidate reference picture list, it may be determined that a motion vector scaling operation may not be associated with using the candidate reference picture list as the motion vector prediction reference picture list associated with the co-located PU on a condition that the reference pictures in the reference picture list associated with the current PU have the same picture order count (POC) values as the reference pictures in candidate reference picture list associated with a co-located PU. When the ILR picture is used as the co-located reference picture of EL TMVP, it may be determined that a motion vector scaling operation may not be associated with using the candidate reference picture list as the motion vector prediction reference picture list associated with the co-located PU on a condition that the candidate reference picture list has a same reference list index as the reference picture list associated with the current PU.

The reference list for the co-located block may be selected based on the input reference list of the current block. For example, the reference list for the co-located block may be set to equal to the input reference list of the current PU. For example, on a condition that the ILR picture is used for the co-located reference picture of EL TMVP, the reference list of the co-located block may be set to equal to the input reference list of the current PU. For a reference index-based SHVC solution, the ILR picture may be used as the co-located reference picture for the EL TMVP process. As shown in FIG. 8, when the ILR picture is selected as the co-located picture to locate the co-located block, except for the ILR pictures, the remaining temporal reference pictures of the current EL picture being coded in lists L0 and L1 may have the same POCs as that of the ILR picture. This may be true when the BL and the EL have the same prediction structure, for example. This may be case for common applications. If currPU and colPU use the same reference picture list for TMVP derivation (e.g., listCol=LX), the MV scaling operation may be more likely to be omitted.

Given the derived reference list of the co-located block, for example in accordance with the examples described herein, the reference index of the current PU may be adjusted such that MV scaling may be omitted for TMVP. This may improve the accuracy of the MV predictor.

For example, in accordance with the TMVP derivation process depicted in FIG. 6, the input reference index refIdxLX for the reference list LX of the current PU may be set to 0 for merge mode. The corresponding prediction component in list LX of the generated temporal merge candidate may come from the reference picture positioned at the first entry of LX. It may be that refIdxLX equal to 0 in list LX may correspond to one EL temporal reference picture for which the POC distance to the current picture, currPocDiff, may not equal to the POC distance, colPocDiff between the co-located block's reference picture in list listCol and the co-located picture itself. As a result, MV scaling, for example as expressed in equation (1), may be applied.

In an embodiment, the reference picture in the reference picture list associated with the current block/PU may be selected such that MV scaling may be bypassed. For example, a reference picture, refPic, in the reference picture list associated with the current block/PU LX may be selected based on a POC distance between a reference picture in a reference list associated with the co-located block and the co-located reference picture, colPocDiff. The index refIdxLX of reference picture of the current PU may be adjusted to another entry in list LX, such that currPocDiff may be equal to colPocDiff.

Figure 10:
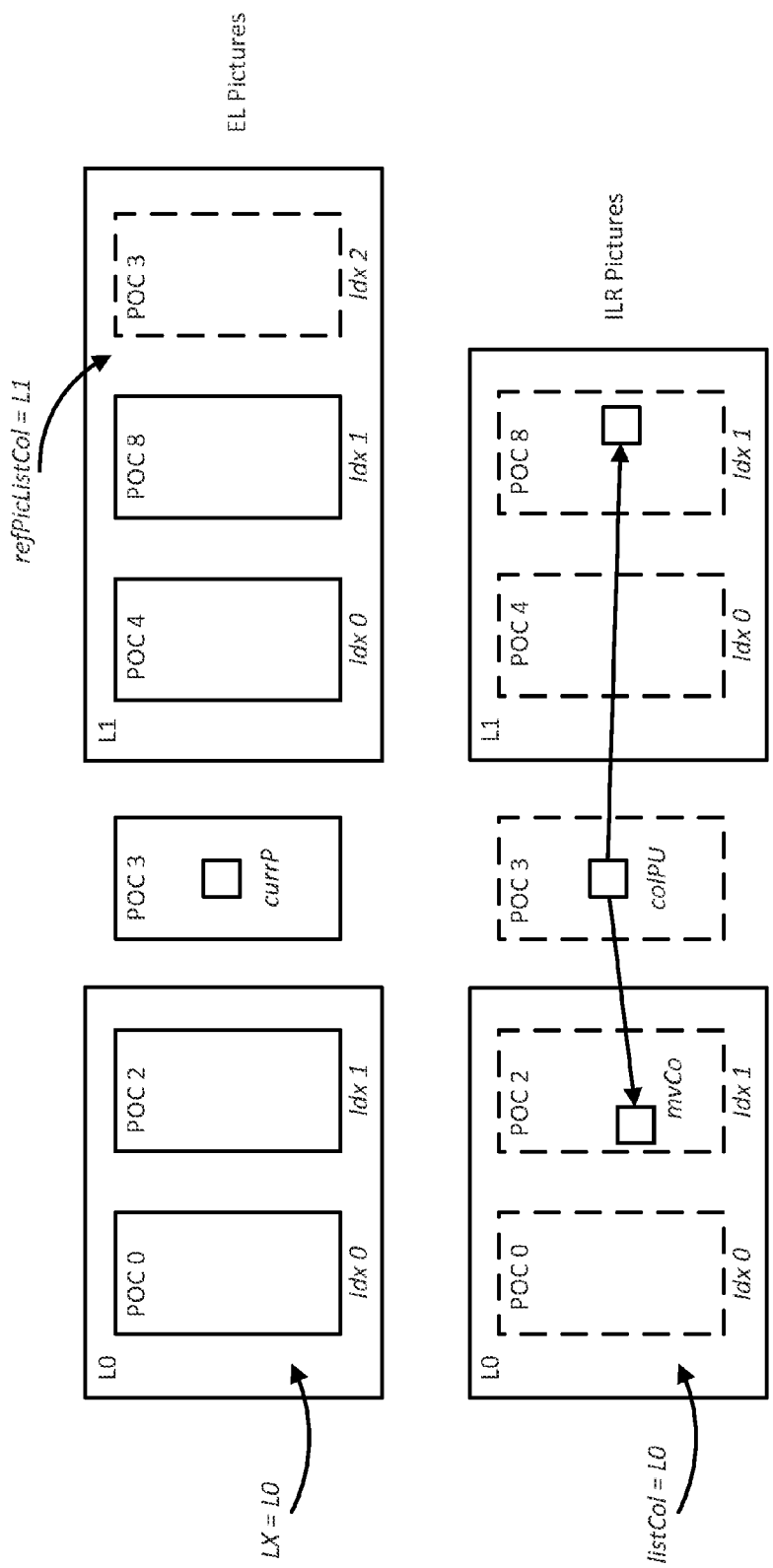
FIG. 10 depicts an example TVMP derivation process.

FIG. 10 depicts an example TVMP derivation process that may be substantially similar to that depicted in FIG. 8, except that the ILR picture may be moved to list L1 of the current picture being coded. For example, refPicListCol may be set to L1. The reference list associated with the co-located block/PU listCol may be set to L0. The colPU's MV mvCol may point to the reference picture POC2, which may be located at the second entry in list listCol of colPU. The reference index refIdxLX may be adjusted such that MV scaling may be omitted. In the example depicted in FIG. 10, MV scaling may be performed when the reference index refIdxLX is 0 mand the reference picture is POC0; whereas when the reference index refIdxLX is adjusted to 1, which may correspond to the reference picture with POC2, MV scaling may be bypassed.

In a scalable video coding system, one or more reference pictures of the current EL picture being coded may be long term pictures. It may be possible that the default reference index equal to 0 in merge mode may correspond to a long term reference picture, while the MV of the co-located block may point to a short term picture. The TMVP candidate may be considered as unavailable. The index of the reference picture in the reference picture list associated with the current block/PU may be set such that additional coding efficiency may be achieved.

The reference index of the current PU may be selected based on whether a motion vector scaling operation may be associated with using a particular reference picture in the reference picture list as a motion vector prediction candidate for the current PU. For example, the reference pictures in a reference picture list associated with a current PU may be examined to determine whether motion vector scaling operation(s) may be associated with using a particular reference picture as the motion vector prediction candidate for performing motion vector prediction. A motion vector prediction candidate may be selected from the reference pictures in the reference picture list based on the examination. For example, a reference picture may be selected as the vector prediction candidate based on a determination that a motion vector scaling operation may not be associated with using the reference picture as the motion vector prediction candidate for performing motion vector prediction.

For a given reference picture in the reference picture list of the current PU, if the reference picture has a same POC distance from the picture associated with the current PU as the POC distance between the picture associated with the co-located PU and a reference picture of the co-located PU, it may be determined that a motion vector scaling operation may not be associated be with using the reference picture as the motion vector prediction candidate for performing motion vector prediction.

The reference picture in the reference picture list associated with the current block/PU may be selected based on a POC distance between a reference picture in a reference list associated with the co-located block and the co-located reference picture. The POCs of the reference pictures of the input reference list LX of currPU may be examined, and the reference index refIdxLX may be set to equal to the index representing a reference picture that may bypass (e.g., not require) an MV scaling operation to generate the TMVP candidate. For example, a reference index refIdxLX that may result in currPocDiff=colPocDiff may be selected. If a reference index in LX refIdxLX that satisfies this condition is not identified, a default reference index, such as an index value 0 may be used.

Figure 11:
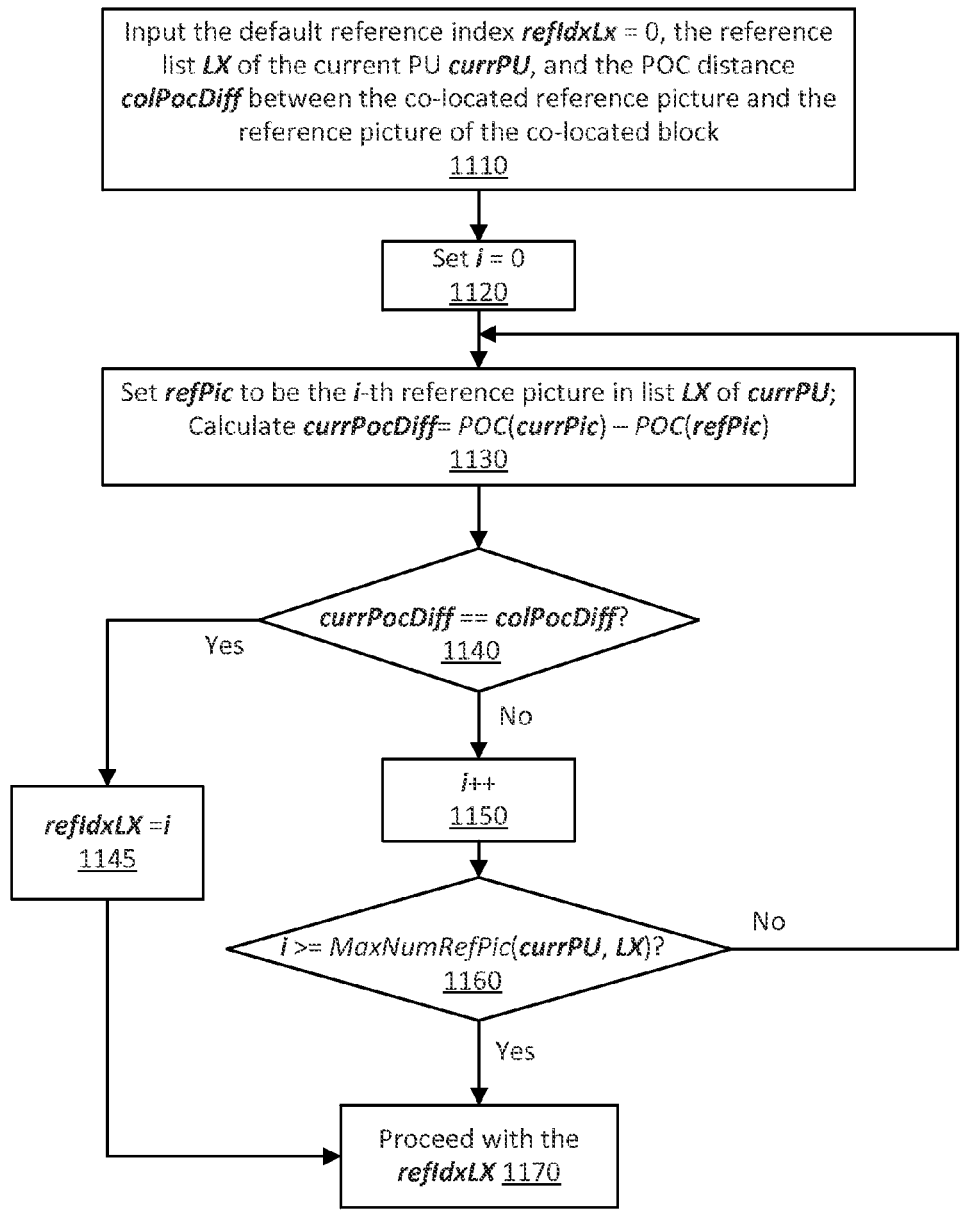
FIG. 11 is a flowchart that depicts an example process of reference index selection of a current prediction unit.

FIG. 11 depicts an example process of reference index selection for the TMVP candidate for EL merge mode. As shown, at 1110, one or more values may be obtained. A default index of the reference picture in the reference picture list associated with the current block/PU, refIdxLX, may be obtained. For example, the default refIdxLX may be set to 0. The reference picture list associated with the current block/PU, LX, may be obtained. A POC distance from a reference picture in a reference list associated with the co-located block and the co-located reference picture, colPocDiff, may be determined. At 1120, an index such as index i may be reset, such as setting to 0. The index may be used to refer to a specific reference picture in the reference picture list associated with the current block/PU LX. At 1130, a reference picture in the LX, such as refPic, may be obtained via the index i. For example, refPic may be set to the ith reference picture in the list LX. The POC distance (e.g., difference in POC numbers, directional distance, and/or absolute distance) between the current picture being coded, currPic, and the reference picture refPic may be calculated. The POC distance between the current picture and the reference picture in the reference picture list associated with the current block/PU may be referred to as currPocDiff.

At 1140, the POC distance between the current picture and the reference picture in the reference picture list associated with the current block may be compared to POC distance between the reference picture in the reference list associated with the co-located block and the co-located reference picture. For example, whether currPocDiff equals to or is substantially similar to colPocDiff may be determined. On a condition that currPocDiff equals to or is substantially similar to colPocdiff, at 1145, the index of the reference picture in the reference picture list associated with the current block/PU refIdxLX may be set to the present value of index i. On a condition that currPocDiff does not equal to or is substantially different than colPocDiff, at 1150, the index i may be incremented by one such that the i th reference picture in the list LX may refer to the next reference picture in the list.

Another reference picture from the reference picture list associated with a current PU for the motion vector prediction candidate based on a determination that a motion vector scaling operation may be associated with using the reference picture as motion vector prediction candidate for performing motion vector prediction.

At 1160, it may be determined whether the reference pictures in the input reference list LX of currPU have been examined. If there are reference picture(s) in the input reference list LX of currPU that have yet to be examined, a next reference picture in the list may be examined at 1130-1160. If the reference pictures in the input reference list LX of currPU have been examined, a default reference index may be selected. For example, the value of index i may be compared to the maximum number of reference pictures in the reference list of the current block. If the i is less than the maximum number of reference pictures in the reference list of the co-located block, steps 1130-1160 may be repeated such that the other reference pictures in the reference list of the current block may be examined. If i is greater than or equal to the maximum number of reference pictures in the reference list of the current block a default reference index may be selected. For example, the default reference index 0 may be used to set the value of the reference picture in the reference picture list associated with the current block/PU, refIdxLX. At 1170, the process may proceed to a next step with the selected reference picture in the reference picture list associated with the current block/PU (e.g., the reference picture associated with the reference index refIdxLX).

For a given reference picture in the reference picture list of the current PU, if the reference picture has a same POC value as a reference picture of the co-located PU, it may be determined that a motion vector scaling operation may not be associated be with using the reference picture as the motion vector prediction candidate for performing motion vector prediction. For example, the refIdxLX may be set to an index that correspond to a reference picture having the same POC value as a reference picture of the co-located PU when the ILR picture is used as the co-located reference picture.

The example processes of reference list selection of the co-located block described herein may be performed independently with respect to the example process of reference index selection of the current PU. The example process of reference list selection of the co-located block may be combined with the example process of reference index selection of the current PU, to generate the TMVP candidate for EL merge mode. The example process of reference list selection of the co-located block may be combined with the example process of reference index selection of the current PU, to generate the TMVP candidate for EL merge mode.

If there is a high similarity between the motion field of a current EL picture and the motion field of its ILR picture, the temporal candidate may be more accurate than the spatial candidate to predict the motion of the current PU. In a scalable video coding system where the order of constructing the candidate lists of both the merge mode and the non-merge mode includes placing the temporal candidate after the spatial candidates, a large bit consumption to encode the index of the temporal candidate may result. In the non-merge mode, the temporal candidate may be excluded from the candidate list when the number of valid spatial candidates is equal to two.

The temporal candidate may be placed prior to the spatial candidates for MV prediction for the EL in the merge mode. This may save overhead associated with signaling merge candidate indices, for example due to correlation (e.g., high correlation) between the motion field of the current EL picture and that of its corresponding ILR picture.

An EL merge candidate list may be constructed using the generated temporal candidate. In accordance with an example of the candidate order of the candidate lists for merge mode, the TMVP candidate may be placed after the spatial candidates. When the co-located picture is the ILR picture, the temporal candidate may provide a more accurate MV predictor of the actual EL MVs than the spatial candidates. In an embodiment, on a condition that the co-located picture is the ILR picture, a temporal candidate may be placed in front of the spatial candidates. The TMVP candidate may be placed such that the TMVP candidate may be more likely to be selected by the encoder and or decoder for EL merge mode.

Figure 12:
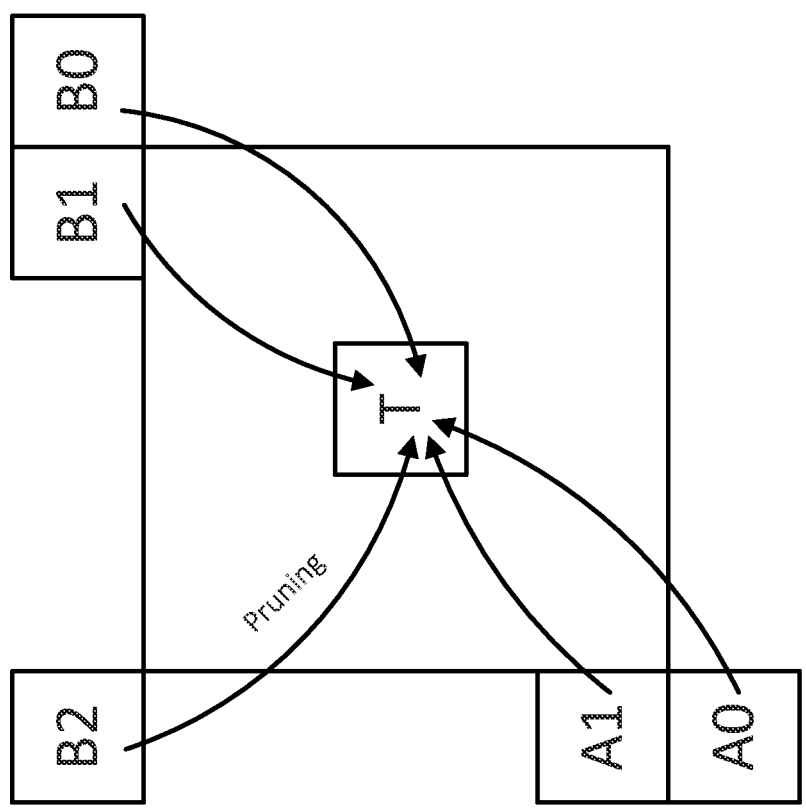
FIG. 12 depicts an example construction process for an enhancement layer merge candidate list.

The merge candidate list may constructed for the EL video coding such that the signaling overhead of EL merge mode may be reduced. FIG. 12 depicts an example construction process for an EL merge candidate list for EL merge mode. The TMVP candidate may be added as the first candidate in the merge candidate list. The TMVP candidate may be derived in accordance with the example processes of reference list selection of the co-located block described with respect to FIGS. 7-9, and/or in accordance with the example TMVP process of merge mode depicted in FIG. 6, for example.

The availabilities of the spatial candidates may be checked and may be added into the merge list according to the order A1, B1, B0, A0 and B2, for example. Pruning may be performed, for example between each spatial candidate and the TMVP candidate, which may remove any redundant entries, such that unique candidates are kept. One TMVP candidate and a one or more spatial candidates (e.g., up to a maximum of four spatial candidates) may be included in the merge list. When the number of temporal and spatial candidates does not reach the maximum number of merge candidates, the bi-predictive candidates and/or zero-motion candidates, for example, may be added to the end of the merge list.

The temporal candidate may be included in the candidate list of the EL video coding for MV prediction for the EL in the non-merge mode. The efficiency of MV prediction may be improved, due to correlation (e.g., high correlation) between the motion field of the current EL picture and that of its corresponding ILR picture.

Efficiency improvements in scalable video coding may be realized in accordance with how the temporal motion vector predictor (TVMP), or temporal candidate, is generated, for example for EL non-merge mode. In accordance with an example current candidate list construction process for non-merge mode, the TMVP candidate may be included in a motion vector prediction candidate list, such as the AMVP candidate list, when the number of available spatial candidates is less than two. In an embodiment, the TMVP candidate may be included in the AMVP candidate list only when the number of available spatial candidates is less than two. When the ILR picture is used as the co-located picture for EL TMVP, the temporal candidate may be more efficient than the spatial candidates. In an embodiment, on a condition that the ILR picture is used as the co-located picture for EL TMVP, the TMVP candidate may be included in the AMVP candidate list. For example, on a condition that the ILR picture is used as the co-located picture for EL TMVP, the TMVP candidate may be included in the AMVP candidate list in regardless of the number of available spatial candidates.

The candidate list for the EL motion vector prediction, such as the AMVP list or any other suitable candidate list, may be constructed such that the TMVP candidate may be included in the list. A selected motion vector prediction candidate may be added to a merging candidate list in a position before that of a spatial motion vector prediction candidate. A selected motion vector prediction candidate may be added to the merging candidate list in place of a spatial motion vector prediction candidate.

Figure 13:
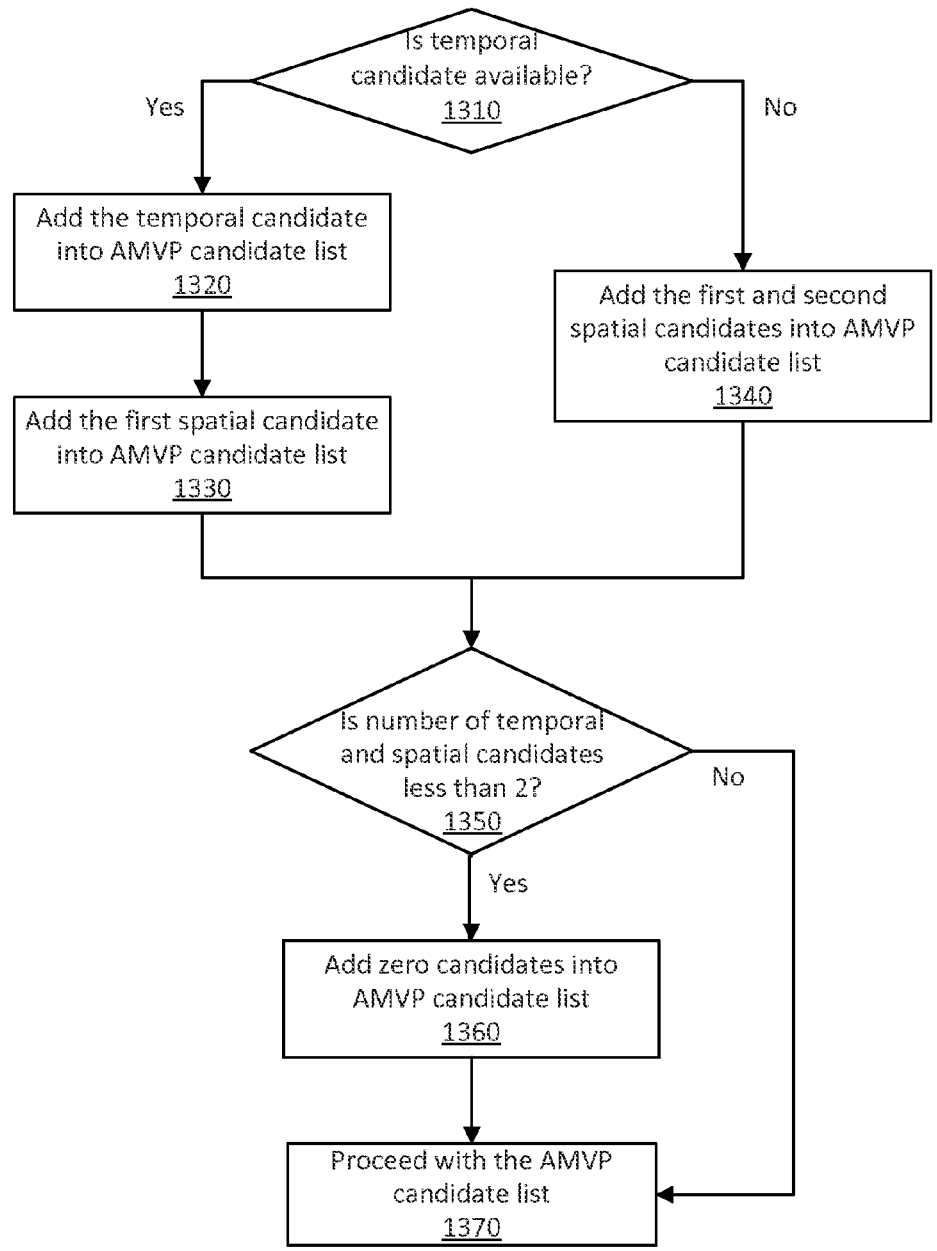
FIG. 13 is a flowchart that depicts an example process of advance motion vector prediction (AVMP) candidate list construction.

FIG. 13 depicts an example motion vector prediction candidate list construction process. The motion vector prediction candidate list may include an AMVP candidate list. The TMVP candidate may be added as a first candidate of the AMVP candidate list when the ILR picture is used as the co-located picture for EL coding. Depending on the availability of the TMVP candidate, one or two of the five spatial candidates, for example as depicted in FIG. 5, may be selected and may be added into the list.

As shown, at 1310, whether a temporal candidate is available may be determined. On a condition that a temporal candidate is available, the temporal candidate may be added to the motion vector prediction candidate list at 1320. At 1330, spatial candidate(s) may be added to the motion vector prediction candidate list. For example, the first spatial candidate may be placed after the temporal candidate in the motion vector prediction candidate list. On a condition that temporal candidate(s) are unavailable, spatial candidates may be added to the AMVP candidate list at 1340. At 1350, it may be determined whether the motion vector prediction candidate list is full. For example, whether the number of the temporal and spatial candidates is less than a predetermined candidate list size may be determined. The predetermined candidate list size may be 2, 3, 4, or any other suitable number. On a condition that the motion vector prediction candidate list is not full, at 1360, zero candidates may be added to the candidate list. At 1370, the process may proceed to the next step with the motion vector prediction candidate list. On a condition that the motion vector prediction candidate list is full, at 1370, the process may proceed to the next step with the motion vector prediction candidate list.

Referring to FIG. 12, a first spatial candidate may be chosen from the pair of left positions A1 and A0. A second spatial candidate may be chosen from the set of top positions B1, B0 and B2. In an example, the second spatial candidate may be added to the candidate list if and only if one or both of the TMVP candidate and the first spatial candidate are unavailable. If the number of unique temporal and spatial candidates is less than two, zero candidates may be added into the end of the list.

Figure 14:
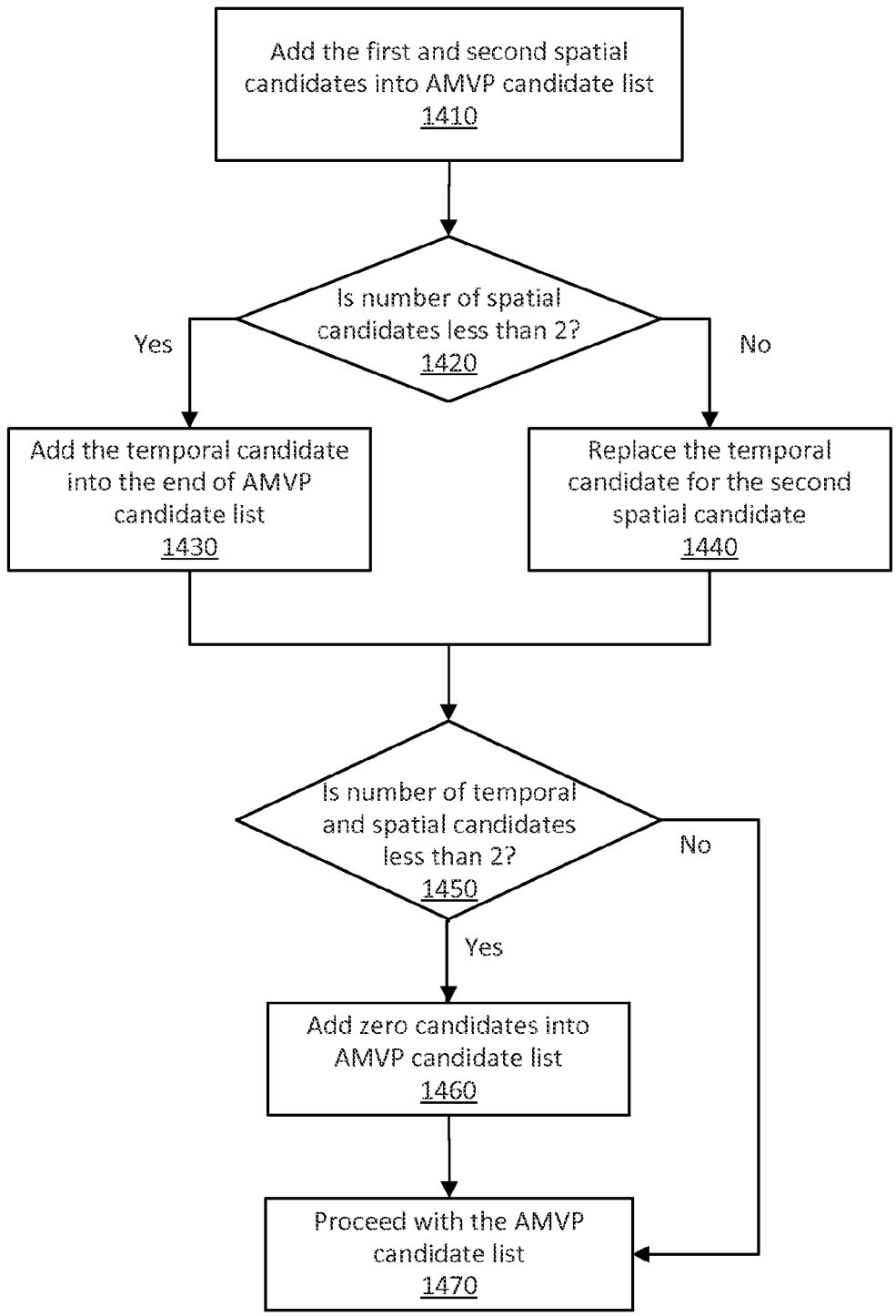
FIG. 14 is a flowchart that depicts an example process of notion vector prediction candidate list construction.

FIG. 14 depicts an example motion vector prediction candidate list construction process. As shown, at 1410, spatial candidate(s) may be added to the motion vector prediction candidate list. At 1420, whether the spatial candidate(s) have filled the motion vector prediction candidate list may be determined. For example, whether the number of spatial candidate(s) is less than 2 may be determined. On a condition that the spatial candidate(s) have not filled the motion vector prediction candidate list, at 1430, the temporal candidate(s) may be added to the end of the motion vector prediction candidate list. On a condition that the spatial candidate(s) have filled the motion vector prediction candidate list, at 1440, the temporal candidate(s) may be added to replace one or more of the spatial candidate(s) in the motion vector prediction candidate list. For example, the second spatial candidate may be replaced with a temporal candidate. At 1450, it may be determined whether the motion vector prediction candidate list is full. For example, whether the number of the temporal and spatial candidates is less than a predetermined candidate list size may be determined. The predetermined candidate list size may be 2, 3, 4, or any other suitable number. On a condition that the motion vector prediction candidate list is not full, at 1460, zero candidates may be added to the candidate list. At 1470, the process may proceed to the next step with the motion vector prediction candidate list. On a condition that the motion vector prediction candidate list is full, at 1470, the process may proceed to the next step with the motion vector prediction candidate list.

In accordance with the illustrated example motion vector prediction candidate list construction process, two spatial candidates among the five spatial candidates, for example as depicted in FIG. 5 may be selected and may be added into the list. The first spatial candidate may come from the left positions A1 and A0 and the second spatial candidate may come from the top positions B1, B0 and B2. The temporal candidate may be added into the list, for example regardless of the number of available spatial candidates. If there are none, or only one, spatial candidates available in the list, the temporal candidate may be added to the end of the list. If there are two spatial candidates available, the temporal candidate may be added into the list, for example replacing the last spatial candidate. Zero candidates may be added, for example repeatedly, until the number of candidates is equal to two.

The example processes for enhancing the coding efficiency of a scalable video coding system, for example the example processes of reference list selection for a co-located block for merge mode and the example AMVP candidate list construction processes for non-merge mode, may be enabled and/or disabled for the EL video coding at a sequence level and/or a picture/slice level, for example by signaling in the bit steam for the EL video encoder and/or decoder.

In an example, sequence level and/or picture/slice level flags may be included in the bit stream to indicate whether a modified process for generating the TMVP candidate or a default process for generating the TMVP candidate is to be applied for EL merge mode and/or non-merge mode. For sequence level signaling, the flags may be added to one or more parameter sets, such as a video parameter set (VPS), a sequence parameter set (SPS), and/or a picture parameter set (PPS).

FIG. 15 is a table that depicts an example of sequence level signaling by adding two flags into SPS. For example, a parameter, such as sps_tmvp_merge_modified_flag, may indicate whether a modified merge TMVP candidate generation process, for example, the example process(es) of reference list selection for a co-located block for merge mode described herein, is to be applied to encode the slices in the current layer. Setting the sps_tmvp_merge_modified_flag equal to 1 may specify that a modified merge TMVP candidate generation process is to be applied to encode the slices in the current layer identified by nuh_layer_id. Setting the sps_tmvp_merge_modified_flag equal to 0 may specify that the merge TMVP candidate generation process used to encode the current slices in the current layer identified by nuh_layer_id is not modified. When the sps_tmvp_merge_modified_flag is absent (e.g., not signaled), it may be inferred to be 0.

For example, a parameter, such as sps_tmvp_non_merge_modified_flag may be included in signaling to indicate whether a modified non-merge TMVP candidate generation process, for example, the example motion vector prediction candidate list construction process(es) for non-merge mode described herein, is to be applied to encode the slices in the current layer. Setting the sps_tmvp_non_merge_modified_flag equal to 1 may specify that a modified non-merge TMVP candidate generation process, for example the example AMVP candidate list construction processes for non-merge mode, is to be applied to encode the slices in the current layer identified by nuh_layer_id. Setting the sps_tmvp_non_merge_modified_flag equal to 0 may specify that the non-merge TMVP candidate generation process used to encode the slices in the current layer identified by nuh_layer_id is not modified. When the sps_tmvp_non_merge_modified_flag is absent (e.g., not signaled), it may be inferred to be 0.

FIG. 16 is a table that depicts an example of picture and/or slice level signaling by adding two flags into the slice header. For example, a parameter, such as slice_tmvp_merge_modified_flag may be signaled to indicate whether a modified merge TMVP candidate generation process, for example, the process(es) of reference list selection for a co-located block for merge mode described herein is to be applied to encode the current slice. Setting the slice_tmvp_merge_modified_flag equal to 1 may specify that a modified merge TMVP candidate generation process is to be applied to encode the current slice. Setting the slice_tmvp_merge_modified_flag equal to 0 may specify that the merge TMVP candidate generation process used to encode the current slice is not modified. When the slice_tmvp_merge_modified_flag is absent (e.g., not signaled), it may be inferred to be 0.

A parameter, such as slice_tmvp_non_merge_modified_flag may be signaled to indicate whether a modified non-merge TMVP candidate generation process, for example, the example motion vector prediction candidate list construction process(es) for non-merge mode described herein is to be applied to encode the current slice. Setting the slice_tmvp_non_modified_modified_flag equal to 1 may specify that a modified non-merge TMVP candidate generation process is to be applied to encode the current slice. Setting the slice_tmvp_non_modified_modified_flag equal to 0 may specify that the non-merge TMVP candidate generation process used to encode the current slice is not modified. When the slice_tmvp_non_merge_modified_flag is absent (e.g., not signaled), it may be inferred to be 0.

Below are example implementations of the above-described example processes for enhancing the coding efficiency of a scalable video coding system, for example the example processes of reference list selection for a co-located block for merge mode and the example AMVP candidate list construction processes for non-merge mode.

Derivation Process for Luma Motion Vectors for Merge Mode

This process is only invoked when merge_flag[xPb][yPb] is equal to 1, where (xPb, yPb) specify the top-left sample of the current luma prediction block relative to the top-left luma sample of the current picture.

Inputs to this process are:
 a luma location (xCb, yCb) of the top-left sample of the current luma coding block relative to the top-left luma sample of the current picture,
 a luma location (xPb, yPb) of the top-left sample of the current luma prediction block relative to the top-left luma sample of the current picture,
 a variable nCbS specifying the size of the current luma coding block,
 two variables nPbW and nPbH specifying the width and the height of the luma prediction block,
 a variable partIdx specifying the index of the current prediction unit within the current coding unit.

Outputs of this process are:
 the luma motion vectors mvL0 and mvL1,
 the reference indices refIdxL0 and refIdxL1,
 the prediction list utilization flags predFlagL0 and predFlagL1.

The location (xOrigP, yOrigP) and the variables nOrigPbW and nOrigPbH are derived to store the values of (xPb, yPb), nPbW, and nPbH as follows:
(xOrigP, yOrigP) is set equal to (xPb, yPb)
nOrigPbW=nPhW
nOrigPbH=nPbH When Log2ParMrgLevel is greater than 2 and nCbS is equal to 8, (xPb, yPb), nPbW, nPbH, and partIdx are modified as follows:
(xPb, yPb)=(xCb, yCb)
nPbW=nCbS
nPbH=nCbS
partIdx=0

NOTE—When Log2ParMrgLevel is greater than 2 and nCbS is equal to 8, the prediction units of the current coding unit share a single merge candidate list, which is identical to the merge candidate list of the 2N×2N prediction unit.

The motion vectors mvL0 and mvL1, the reference indices refIdxL0 and refIdxL1, and the prediction utilization flags predFlagL0 and predFlagL1 are derived by the following ordered steps:

1. The derivation process for merging candidates from neighbouring prediction unit partitions is invoked with the luma coding block location (xCb, yCb), the coding block size nCbS, the luma prediction block location (xPb, yPb), the luma prediction block width nPbW, the luma prediction block height nPbH, and the partition index partIdx as inputs, and the output being the availability flags availableFlag$A_0$, availableFlag$A_1$, availableFlag$B_0$, availableFlag$B_1$, and availableFlag$B_2$, the reference indices refIdxLX$A_0$, refIdxLX$A_1$, refIdxLX$B_0$, refIdxLX$B_1$, and refIdxLX$B_2$, the prediction list utilization flags predFlagLX$A_0$, predFlagLX$A_1$, predFlagLX$B_0$, predFlagLX$B_1$, and predFlagLX$B_2$, and the motion vectors mvLX$A_0$, mvLX$A_1$, mvLX$B_0$, mvLX$B_1$, and mvLX$B_2$, with X being 0 or 1.

2. The reference indices for the temporal merging candidate, refIdxLXCol, with X being 0 or 1, are set equal to 0.

3. The flag mergeEL is set to 0 if nuh_layer_id is equal to 0, and set to 1 otherwise.

4. The derivation process for temporal luma motion vector prediction is invoked with the luma location (xPb, yPb), the luma prediction block width nPbW, the luma prediction block height nPbH, and the variable mergeEL and the variable refIdxL0 Col as inputs, and the output being the availability flag availableFlagL0 Col and a modified refIdxL0Col and the temporal motion vector mvL0Col. The variables availableFlagCol, predFlagL0Col and predFlagL1Col are derived as follows:
availableFlagCol=availableFlagL0Col
predFlagL0Col=availableFlagL0Col
predFlagL1Col=0

5. When slice_type is equal to B, the derivation process for temporal luma motion vector prediction is invoked with the luma location (xPb, yPb), the luma prediction block width nPbW, the luma prediction block height nPbH, and the variable mergeEL and the variable refIdxL1Col as inputs, and the output being the availability flag availableFlagL1Col and a modified refIdxL1Col and the temporal motion vector mvL1Col. The variables availableFlagCol and predFlagL1Col are derived as follows:
availableFlagCol=availableFlagL0Col||availableFlagL1Col
predFlagL1Col=availableFlagL1Col 6. The merging candidate list, mergeCandList, is constructed as follows:
   If mergeEL is equal to 0, mergeCandList is constructed as
     i=0
     if(availableFlagA$_1$)
       mergeCandList[i++]=A$_1$
     if(availableFlagB$_1$)
       mergeCandList[i++]=B$_1$
     if(availableFlagB$_0$)
       mergeCandList[i++]=B$_0$
     if(availableFlagA$_0$)
       mergeCandList[i++]=A$_0$
     if(availableFlagB$_2$)
       mergeCandList[i++]=B$_2$
     if(availableFlagCol)
       mergeCandList[i++]=Col
   Otherwise, mergeCandLIst is constructed as
     i=0
     if(availableFlagCol)
       mergeCandList[++]=Col
     if(availableFlagA1 && A1 is not equal to Col)
       mergeCandList[i++]=A1
     if(availableFlagB1 && B1 is not equal to Col)
       mergeCandList[i++]=B1
     if(availableFlagB0 && B0 is not equal to Col)
       mergeCandList[i++]=B0
     if(availableFlagA0 && A0 is not equal to Col)
       mergeCandList[i++]=A0
     if(availableFlagB2 && B2 is not equal to Col)
       mergeCandList[i++]=B2

7. The variable numCurrMergeCand and numOrigMergeCand are set equal to the number of merging candidates in the mergeCandList.

8. When slice type is equal to B, the derivation process for combined bi-predictive merging candidates is invoked with mergeCandList, the reference indices refIdxL0N and refIdxL1N, the prediction list utilization flags predFlagL0N and predFlagL1N, the motion vectors mvL0N and mvL1N of every candidate N in mergeCandList, numCurrMergeCand, and numOrigMergeCand as inputs, and the output is assigned to mergeCandList, numCurrMergeCand, the reference indices refIdxL0combCand$_k$ and refIdxL1combCand$_k$, the prediction list utilization flags predFlagL0combCand$_k$ and predFlagL1combCand$_k$, and the motion vectors mvL0combCand$_k$ and mvL1combCand$_k$ of every new candidate combCand$_k$ being added into mergeCandList. The number of candidates being added, numCombMergeCand, is set equal to (numCurrMergeCand=numOrigMergeCand). When numCombMergeCand is greater than 0, k ranges from 0 to numCombMergeCand−1, inclusive.

9. The derivation process for zero motion vector merging candidates is invoked with the mergeCandList, the reference indices refIdxL0N and refIdxL1N, the prediction list utilization flags predFlagL0N and predFlagL1N, the motion vectors mvL0N and mvL1N of every candidate N in mergeCandList, and numCurrMergeCand as inputs, and the output is assigned to mergeCandList, numCurrMergeCand, the reference indices refIdxL0zeroCand$_m$ and refIdxL1zeroCand$_m$, the prediction list utilization flags predFlagL0zeroCand$_m$ and predFlagL1zeroCand$_m$, and the motion vectors mvL0zeroCand$_m$ and mvL1zeroCand$_m$ of every new candidate zeroCand$_m$ being added into mergeCandList. The number of candidates being added, numZeroMergeCand, is set equal to (numCurrMergeCand−numOrigMergeCand−numCombMergeCand). When numZeroMergeCand is greater than 0, m ranges from 0 to numZeroMergeCand−1, inclusive.

10. The following assignments are made with N being the candidate at position merge_idx[xOrigP][yOrigP] in the merging candidate list mergeCandList (N=mergeCandList[merge_idx[xOrigP][yOrigP]]) and X being replaced by 0 or 1:
    mvLX[0]=mvLXN[0]
    mvLX[1]=mvLXN[1]
    refIdxLX=refIdxLXN
    predFlagLX=predFlagLXN 11. When predFlagL0 is equal to 1 and predFlagL1 is equal to 1, and (nOrigPbW+nOrigPbH) is equal to 12, the following applies:
    refIdxL1=−1
    predFlagL1=0

Derivation Process for Luma Motion Vector Prediction
Inputs to this process are:
   a luma location (xCb, yCb) of the top-left sample of the current luma coding block relative to the top-left luma sample of the current picture.
   a variable nCbS specifying the size of the current luma coding block,
   a luma location (xPb, yPb) specifying the top-left sample of the current luma prediction block relative to the top-left luma sample of the current picture,
   two variables nPbW and nPbH specifying the width and the height of the luma prediction block,
   the reference index of the current prediction unit partition refIdxLX, with X being 0 or 1,
   a variable partIdx specifying the index of the current prediction unit within the current coding unit.

Output of this process is the prediction mvpLX of the motion vector mvLX, with X being 0 or 1.

The motion vector predictor mvpLX is derived in the following ordered steps:

1. The derivation process for motion vector predictor candidates from neighbouring prediction unit partitions is invoked with the luma coding block location (xCb, yCb), the coding block size nChS, the luma prediction block location (xPb, yPb); the luma prediction block width nPbW, the luma prediction block height nPbH, refIdxLX, with X being 0 or 1, and the partition index partIdx as inputs, and the availability flags availableFlagLXN and the motion vectors mvLXN, with N being replaced by A or B, as output.

2. If both availableFlagLXA and availableFlagLXB are equal to 1 and mvLXA is not equal to mvLXB, availableFlagLXCol is set equal to 0. Otherwise, the derivation process for temporal luma motion vector prediction is invoked with luma prediction block location (xPb, yPb), the luma prediction block width nPbW, luma prediction block height nPbH, and the flag mergeEL is set equal to 1 and refIdxLX, with X being 0 or 1, as inputs, and with the output being the availability flag availableFlagLXCol and a modified refIdxLX and the temporal motion vector predictor mvLXCol.

3. The flag amvpEL is set to 0 if nuh_layer_id is equal to 0, and set to 1 otherwise.

4. The motion vector predictor candidate list, mvpListLX, is constructed as follows:
    if amvpEL is equal to 0,
        i=0
        if(availableFlagLXA)
            mvpListLX[i++]=mvLXA
        if(availableFlagLXB)
            mvpListLX[i++]=mvLXB
        if(availableFlagLXCol)
            mvpListLX[i++]=mvLXCol
    Otherwise,
        i=0
        if(availableFlagLXCol)
            mvpListLX[i++]=mvLXCol
        if(availableFlagLXA && A is not equal to Col)
            mvpListLX[i++]=mvLXA
        if(availableFlagLXB && B is not equal to Col)
            mvpListLX[i++]=mvLXB
    Otherwise,
        i=0
        if(availableFlagLXA)
            mvpListLX[i++]=mvLXA
        if(availableFlagLXB)
            mvpListLX[i++]=mvLXB
        if(availableFlagLXCol)
            if(availableFlagLXA && !availableFlagLXB && Col is not equal to A)
                mvpListLX[i++]=mvLXCol
            else if(!availableFlagLXA && availableFlagLXB && Col is not equal to B)
                mvpListLX[i++]=mvLXCol
            if(availableFlagLXA && availableFlagLXB && Col is not equal to A && Col is not equal to B)
                mvpListLX[1]=mvLXCol
5. The motion vector predictor list is modified as follows:
    When mvLXA and mvLXB have the same value, mvLXB is removed from the list and the variable numMvpCandLX is set equal to the number of elements within the mvpListLX.
    When numMvpCandLX is less than 2, the following applies repeatedly until numMvpCandLX is equal to 2:
        mvpListLX[numMvpCandLX][0]=0
        mvpListLX[numMvpCandLX][1]=0
        numMvpCandLX=numMvpCandLX+1
    When numMvpCandLX is greater than 2, motion vector predictor candidates mvpListLX[idx] with idx greater than 1 are removed from the list.
The motion vector of mvpListLX[mvp_1X_flag[xPb][yPb]] is assigned to mvpLX.

Derivation Process for Temporal Luma Motion Vector Prediction
    Inputs to this process are:
    a luma location (xPb, yPb) specifying the top-left sample of the current luma prediction block relative to the top-left luma sample of the current picture,
    two variables nPbW and nPbH specifying the width and the height of the luma prediction block,
    a flag mergeEL,
    a reference index refIdxLX, with X being 0 or 1.
    Outputs of this process are:
    the motion vector prediction mvLXCol,
    the availability flag availableFlagLXCol,
    the modified reference index refIdxLX.
    The variable currPb specifies the current luma prediction block at luma location (xPb, yPb).

The variables mvLXCol and availableFlagLXCol and the modified refIdxLX are derived as follows:
    If slice_temporal_mvp_enabled_flag is equal to 0, both components of mvLXCol are set equal to 0 and availableFlagLXCol is set equal to 0.
    Otherwise, the following ordered steps apply:
        1. Depending on the values of slice_type, collocated_from_l0_flag, and collocated_ref_idx, the variable colPic, specifying the collocated picture, is derived as follows:
            If slice_type is equal to B and collocated_from_l0_flag is equal to 0, colPic is set equal to RefPicList1[collocated_ref_idx].
            Otherwise (slice_type is equal to B and collocated_from_l0_flag is equal to 1 or slice_type is equal to P), colPic is set equal to RefPicList0[collocated_ref_idx].
        2. The bottom right collocated motion vector is derived as follows:
            xColBr=xPb+nPbW
            yColBr=yPb+nPbH
            If yPb>>CtbLog2SizeY is equal to yColBr>>CtbLog2SizeY, yColBr is less than pic_height_in_luma_samples, and xColBr is less than pic_width_in_luma_samples, the following applies:
                The variable colPb specifies the luma prediction block covering the modified location given by ((xColBr>>4)<<4, (yColBr>>4)<<4) inside the collocated picture specified by colPic.
                The luma location (xColPb, yColPb) is set equal to the top-left sample of the collocated luma prediction block specified by colPb relative to the top-left luma sample of the collocated picture specified by colPic.
                The derivation process for collocated motion vectors is invoked with currPb, colPic, colPb, (xColPb, yColPb), and mergeEL and refIdxLX as inputs, and the output is assigned to mvLXCol and availableFlagLXCol and a modified version of refIdxLX.
            Otherwise, both components of mvLXCol are set equal to 0 and availableFlagLXCol is set equal to 0.
        3. When availableFlagLXCol is equal to 0, the central collocated motion vector is derived as follows:
            xColCtr=xPb+(nPbW>>1)
            yColCtr=yPb+(nPbH>>1)
            The variable colPb specifies the luma prediction block covering the modified location given by ((xColCtr>>4)<<4, (yColCtr>>4)<<4) inside the
            The luma location (xColPb, yColPb) is set equal to the top-left sample of the collocated luma prediction block specified by colPb relative to the top-left luma sample of the collocated picture specified by colPic.
        The derivation process for collocated motion vectors is invoked with currPb, colPic, colPb, (xColPb, yColPb), and mergeEL and refIdxLX as inputs, and the output is assigned to mvLXCol and availableFlagLXCol and a modified version of refIdxLX.

Derivation Process for Collocated Motion Vectors
    Inputs to this process are:
    a variable currPb specifying the current prediction block,
    a variable colPic specifying the collocated picture,
    a variable colPb specifying the collocated prediction block inside the collocated picture specified by colPic,
    a luma location (xColPb, yColPb) specifying the top-left sample of the collocated luma prediction block specified by colPb relative to the top-left luma sample of the collocated picture specified by colPic, a flag mergeEL, a reference index refIdxLX, with X being 0 or 1.

Outputs of this process are:

the motion vector prediction mvLXCol, the availability flag availableFlagLXCol, the modified reference index refIdxLX.

The variable currPic specifies the current picture.

The arrays predFlagLXCol[x][y], mvLXCol[x][y], and refIdxLXCol[x][y] are set equal to the corresponding arrays of the collocated picture specified by colPic, PredFlagLX[x][y], MvLX[x][y], and RefIdxLX[x][y], respectively, with X being the value of X this process is invoked for.

The variables mvLXCol and availableFlagLXCol are derived as follows:

If colPb is coded in an intra prediction mode, both components of mvLXCol are set equal to 0 and availableFlagLXCol is set equal to 0.

Otherwise, the motion vector mvCol, the reference index refIdxCol, and the reference list identifier listCol are derived as follows:

If predFlagL0Col[xColPb][yColPb] is equal to 0, mvCol, refIdxCol, and listCol are set equal to mvL1Col[xColPb][yColPb], refIdxL1Col[xColPb][yColPb], and L1, respectively.

Otherwise, if predFlagL0Col[xColPb][yColPb] is equal to 1 and predFlagL1Col[xColPb][yColPb] is equal to 0, mvCol, refIdxCol, and listCol are set equal to mvL0Col[xColPb][yColPb], refIdxL0Col[xColPh][yColPb], and L0, respectively.

Otherwise (predFlagL0Col[xColPb][yColPb] is equal to 1 and predFlagL1Col[xColPb][yColPb] is equal to 1), the following assignments are made:

If DiffPicOrderCnt(aPic, currPic) is less than or equal to 0 for every picture aPic in every reference picture list of the current slice, mvCol, refIdxCol, and listCol are set equal to mvLXCol[xColPb][yColPb], refIdxLXCol[xColPb][yColPb] and LX, respectively.

Otherwise, mvCol, refIdxCol, and listCol are set equal to mvLNCol[xColPb][yColPb], refIdxLNCol[xColPb][yColPb], and LN, respectively, with N being the value of collocated_from_10_flag.

When mergeEL is equal to 1, the mvCol, refIdxCol and listCol are modified as follow.

The variables mvColNew, refIdxColNew and listColNew are set equal to mvCol, refIdxCol and listCol respectively, and the flag bNoScalingListFlag is set equal to 0. The following applies to reference list LY from listCol to 1−listCol, until bNoScalingListFlag is equal to 1.

if DiffPicOrderCnt(aPic, currPic) is equal to DiffPicOrderCnt(refPicListLYCol[refIdxLYCol[xColPb][yColPb]], colPic) for a picture aPic in list LX of currPic, mvColNew, refIdxColNew and listColNew are set equal to mvLYCol[xColPb][yColPb], refIdxLYCol[xColPb][yColPb] and LY respectively, and bNoScalingListFlag is set equal to 1.

If bNoScalingListFlag is equal to 1, mvCol, refIdxCol and listCol are set equal to mvColNew, refIdxColNew and listColNew respectively.

Otherwise, mvCol, refIdxCol and listCol are not modified.

When mergeEL is equal to 1, mvCol, refIdxCol, and listCol are set equal to mvLXCol[xColPb][yColPb], refIdxLXCol[xColPb][yColPb] and LX, respectively.

and when mergeEL is equal to 1, the reference index refIdxLX is modified as follows.

The variable refIdxNew is set equal to refIdxLX and the flag bNoScalingFlag is set equal to 0. For refIdxTemp from 0 to num_ref_idx_1x_active_minus1, the following applies repeatedly until bNoScalingFlag is equal to 1.

When DiffPicOrderCnt(currPic, RefPicListX[refIdxTemp]) is equal to DiffPicOrderCnt(colPic, refPicListCol[refIdxCol]) and LongTermRefPic(currPic, currPb, refIdxTemp, ListX) is equal to LongTermRefPic(colPic, colPb, refIdxCol, listCol), refIdxNew is set equal to refIdxTemp and bNoScalingFlag is set equal to 1.

If bNoScalingFlag is equal to 1, refIdxLX is set equal to refIdxNew.

Otherwise, refIdxLX is not modified.

and mvLXCol and availableFlagLXCol are derived as follows:

If LongTermRefPic(currPic, currPb, refIdxLX, LX) is not equal to LongTermRefPic(colPic, colPb, refIdxCol, listCol), both components of mvLXCol are set equal to 0 and availableFlagLXCol is set equal to 0.

Otherwise, the variable availableFlagLXCol is set equal to 1, refPicListCol[refIdxCol] is set to be the picture with reference index refIdxCol in the reference picture list listCol of the slice containing prediction block currPb in the picture colPic, and the following applies:

colPocDiff=DiffPicOrderCnt(colPic, refPicListCol[refIdxCol])

currPocDiff=DiffPicOrderCnt(currPic, RefPicListX[refIdxLX])

if RefPicListX[refIdxLX] is a long-term reference picture, or colPocDiff is equal to currPocDiff, mvLXCol is derived as follows:

mvLXCol=mvCol

Otherwise, mvLXCol is derived as a scaled version of the motion vector mvCol as follows:

tx=(16384+(Abs(td)>>1))/td distScaleFactor=Clip3(−4096, 4095, (tb*tx+32)>>6)

mvLXCol=Clip3(−32768, 32767, Sign (distScaleFactor*mvCol)*((Abs (distScaleFactor*mvCol)+127)>>8))

where td and tb are derived as follows:

td=Clip3(−128, 127, colPocDiff)

tb=Clip3(−128, 127, currPocDiff)

The herein described example processes for enhancing the coding efficiency of a scalable video coding system, for example the example processes of reference list selection for a co-located block for merge mode and the example AMVP candidate list construction processes for non-merge mode, may be implemented in accordance with transporting video in a wireless communication system, such as the example wireless communication system 1200, and components thereof, illustrated in FIGS. 17A-17E.

Figure 17A:
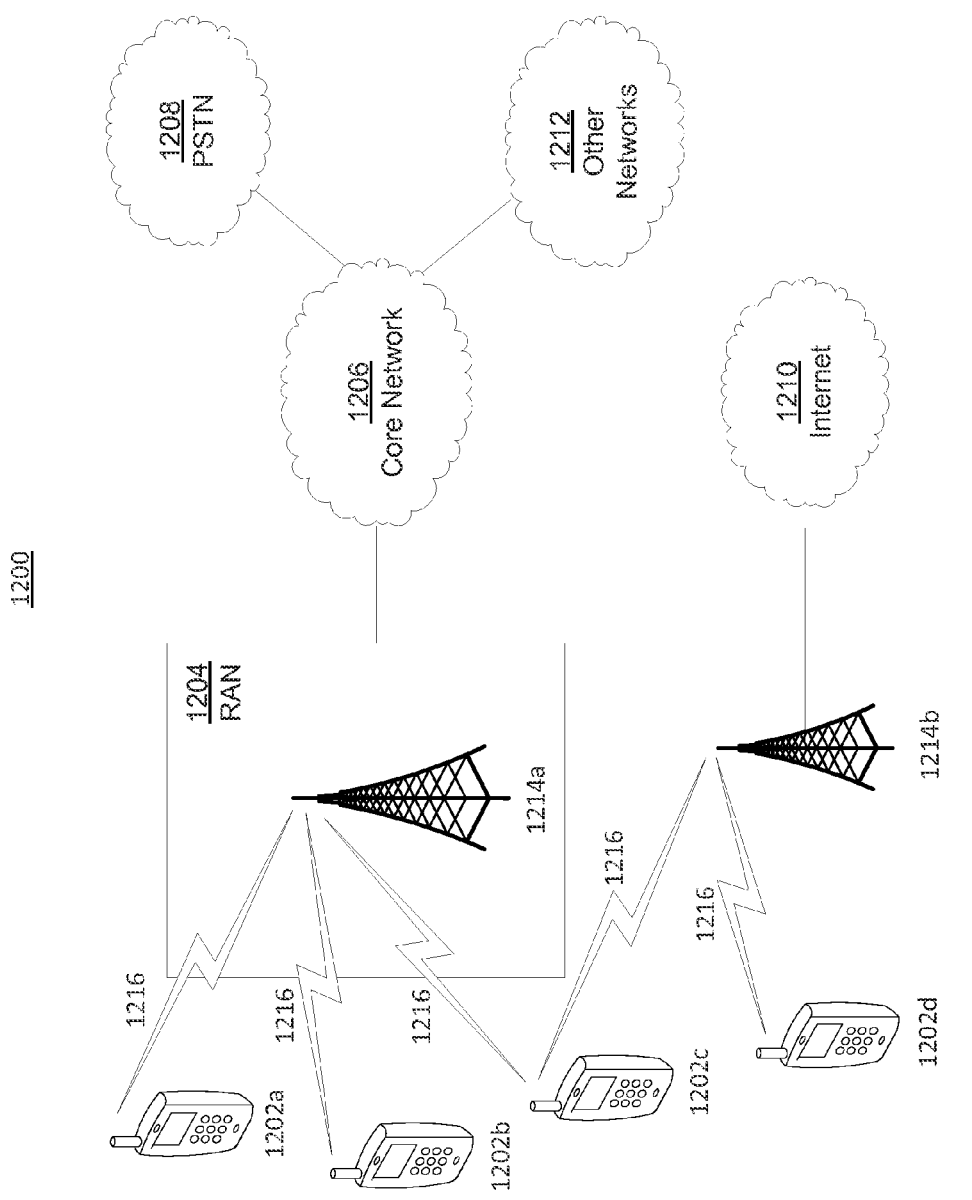
FIG. 17A depicts a system diagram of an example communications system in which one or more disclosed embodiments may be implemented.

FIG. 17A is a diagram of an example communications system 1200 in which one or more disclosed embodiments may be implemented. For example, a wireless network (e.g., a wireless network comprising one or more components of the communications system 1200) may be configured such that bearers that extend beyond the wireless network (e.g., beyond a walled garden associated with the wireless network) may be assigned QoS characteristics.

The communications system 1200 may be a multiple access system that provides content, such as voice, data, video, messaging, broadcast, etc., to multiple wireless users. The communications system 1200 may enable multiple wireless users to access such content through the sharing of system resources, including wireless bandwidth. For example, the communications systems 1200 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 17A, the communications system 1200 may include at least one wireless transmit/receive unit (WTRU), such as a plurality of WTRUs, for instance WTRUs 1202a, 1202b, 1202c, and 1202d, a radio access network (RAN) 1204, a core network 1206, a public switched telephone network (PSTN) 1208, the Internet 1210, and other networks 1212, though it should be appreciated that the disclosed embodiments contemplate any number of WTRUs, base stations, networks, and/or network elements. Each of the WTRUs 1202a, 1202b, 1202c, 1202d may be any type of device configured to operate and/or communicate in a wireless environment. By way of example, the WTRUs 1202a, 1202b, 1202c, 1202d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 1200 may also include a base station 1214a and a base station 1214b. Each of the base stations 1214a, 1214b may be any type of device configured to wirelessly interface with at least one of the WTRUs 1202a, 1202b, 1202c, 1202d to facilitate access to one or more communication networks, such as the core network 1206, the Internet 1210, and/or the networks 1212. By way of example, the base stations 1214a, 1214b may be a base transceiver station (BTS), a Node-B, an eNode B, a Home Node B, a Home eNode B, a site controller, an access point (AP), a wireless router, and the like. While the base stations 1214a, 1214b are each depicted as a single element, it should be appreciated that the base stations 1214a, 1214b may include any number of interconnected base stations and/or network elements.

The base station 1214a may be part of the RAN 1204, which may also include other base stations and/or network elements (not shown), such as a base station controller (BSC), a radio network controller (RNC), relay nodes, etc. The base station 1214a and/or the base station 1214b may be configured to transmit and/or receive wireless signals within a particular geographic region, which may be referred to as a cell (not shown). The cell may further be divided into cell sectors. For example, the cell associated with the base station 1214a may be divided into three sectors. Thus, in one embodiment, the base station 1214a may include three transceivers, i.e., one for each sector of the cell. In another embodiment, the base station 1214a may employ multiple-input multiple output (MIMO) technology and, therefore, may utilize multiple transceivers for each sector of the cell.

The base stations 1214a, 1214b may communicate with one or more of the WTRUs 1202a, 1202b, 1202c, 1202d over an air interface 1216, which may be any suitable wireless communication link (e.g., radio frequency (RF), microwave, infrared (IR), ultraviolet (UV), visible light, etc.). The air interface 1216 may be established using any suitable radio access technology (RAT).

More specifically, as noted above, the communications system 1200 may be a multiple access system and may employ one or more channel access schemes, such as CDMA, TDMA, FDMA, OFDMA, SC-FDMA, and the like. For example, the base station 1214a in the RAN 1204 and the WTRUs 1202a, 1202b, 1202c may implement a radio technology such as Universal Mobile Telecommunications System (UMTS) Terrestrial Radio Access (UTRA), which may establish the air interface 1216 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 1214a and the WTRUs 1202a, 1202b, 1202c may implement a radio technology such as Evolved UMTS Terrestrial Radio Access (E-UTRA), which may establish the air interface 1216 using Long Term Evolution (LTE) and/or LTE-Advanced (LTE-A).

In other embodiments, the base station 1214a and the WTRUs 1202a, 1202b, 1202c may implement radio technologies such as IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 1214b in FIG. 17A may be a wireless router, Home Node B, Home eNode B, or access point, for example, and may utilize any suitable RAT for facilitating wireless connectivity in a localized area, such as a place of business, a home, a vehicle, a campus, and the like, in one embodiment, the base station 1214b and the WTRUs 1202c, 1202d may implement a radio technology such as IEEE 802.11 to establish a wireless local area network (WLAN). In another embodiment, the base station 1214b and the WTRUs 1202c, 1202d may implement a radio technology such as IEEE 802.15 to establish a wireless personal area network (WPAN). In yet another embodiment, the base station 1214b and the WTRUs 1202c, 1202d may utilize a cellular-based RAT (e.g., WCDMA, CDMA2000, GSM, LTE, LTE-A, etc.) to establish a picocell or femtocell. As shown in FIG. 17A, the base station 1214b may have a direct connection to the Internet 1210. Thus, the base station 1214b may not be required to access the Internet 1210 via the core network 1206.

The RAN 1204 may be in communication with the core network 1206, which may be any type of network configured to provide voice, data, applications, and/or voice over internet protocol (VoIP) services to one or more of the WTRUs 1202a, 1202b, 1202c, 1202d. For example, the core network 1206 may provide call control, billing services, mobile location-based services, pre-paid calling, Internet connectivity, video distribution, etc., and/or perform high-level security functions, such as user authentication. Although not shown in FIG. 17A, it should be appreciated that the RAN 1204 and/or the core network 1206 may be in direct or indirect communication with other RANs that employ the same RAT as the RAN 1204 or a different RAT. For example, in addition to being connected to the RAN 1204, which may be utilizing an E-UTRA radio technology, the core network 1206 may also be in communication with another RAN (not shown) employing a GSM radio technology.

The core network 1206 may also serve as a gateway for the WTRUs 1202a, 1202b, 1202c, 1202d to access the PSTN 1208, the Internet 1210, and/or other networks 1212. The PSTN 1208 may include circuit-switched telephone networks that provide plain old telephone service (POTS). The Internet 1210 may include a global system of interconnected computer networks and devices that use common communication protocols, such as the transmission control protocol (TCP), user datagram protocol (UDP) and the internet protocol (IP) in the TCP/IP internet protocol suite. The networks 1212 may include wired or wireless communications networks owned and/or operated by other service providers. For example, the networks 1212 may include another core network connected to one or more RANs, which may employ the same RAT as the RAN 1204 or a different RAT.

Some or all of the WTRUs 1202a, 1202b, 1202c, 1202d in the communications system 1200 may include multi-mode capabilities, i.e., the WTRUs 1202a, 1202b, 1202c, 1202d may include multiple transceivers for communicating with different wireless networks over different wireless links. For example, the WTRU 1202c shown in FIG. 17A may be configured to communicate with the base station 1214a, which may employ a cellular-based radio technology, and with the base station 1214b, which may employ an IEEE 802 radio technology.

Figure 17B:
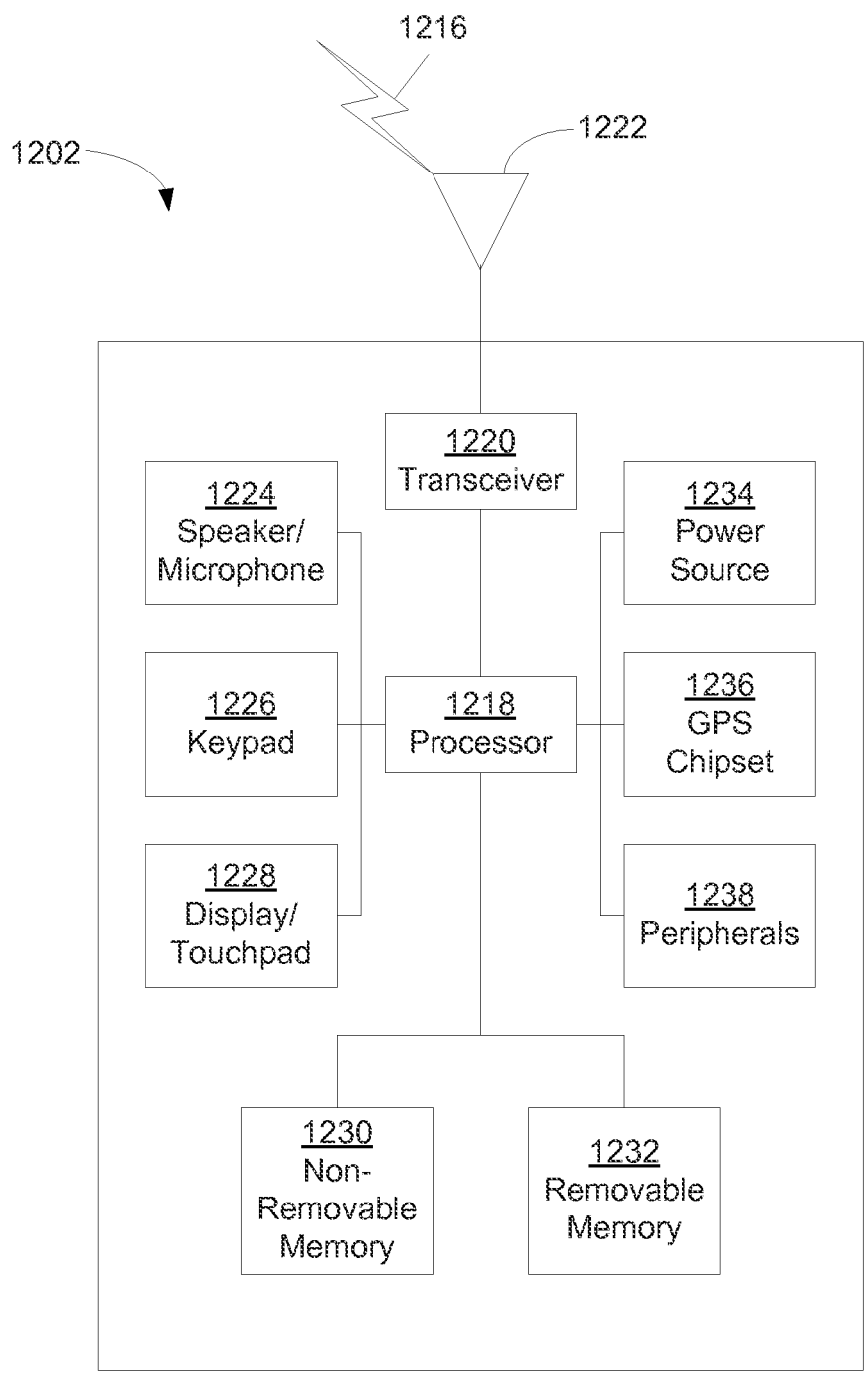
FIG. 17B depicts a system diagram of an example wireless transmit/receive unit (WTRU) that may be used within the communications system illustrated in FIG. 17A.

FIG. 17B is a system diagram of an example WTRU 1202. As shown in FIG. 17B, the WTRU 1202 may include a processor 1218, a transceiver 1220, a transmit/receive element 1222, a speaker/microphone 1224, a keypad 1226, a display/touchpad 1228, non-removable memory 1230, removable memory 1232, a power source 1234, a global positioning system (GPS) chipset 1236, and other peripherals 1238. It should be appreciated that the WTRU 1202 may include any sub-combination of the foregoing elements while remaining consistent with an embodiment.

The processor 1218 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 1218 may perform signal coding, data processing, power control, input/output processing, and/or any other functionality that enables the WTRU 1202 to operate in a wireless environment. The processor 1218 may be coupled to the transceiver 1220, which may be coupled to the transmit/receive element 1222. While FIG. 17B depicts the processor 1218 and the transceiver 1220 as separate components, it should be appreciated that the processor 1218 and the transceiver 1220 may be integrated together in an electronic package or chip.

The transmit/receive element 1222 may be configured to transmit signals to, or receive signals from, a base station (e.g., the base station 1214a) over the air interface 1216. For example, in one embodiment, the transmit/receive element 1222 may be an antenna configured to transmit and/or receive RF signals. In another embodiment, the transmit/receive element 1222 may be an emitter/detector configured to transmit and/or receive IR, UV, or visible light signals, for example. In yet another embodiment, the transmit/receive element 1222 may be configured to transmit and receive both RF and light signals. It should be appreciated that the transmit/receive element 1222 may be configured to transmit and/or receive any combination of wireless signals.

In addition, although the transmit/receive element 1222 is depicted in FIG. 17B as a single element, the WTRU 1202 may include any number of transmit/receive elements 1222. More specifically, the WTRU 1202 may employ MIMO technology. Thus, in one embodiment, the WTRU 1202 may include two or more transmit/receive elements 1222 (e.g., multiple antennas) for transmitting and receiving wireless signals over the air interface 1216.

The transceiver 1220 may be configured to modulate the signals that are to be transmitted by the transmit/receive element 1222 and to demodulate the signals that are received by the transmit/receive element 1222. As noted above, the WTRU 1202 may have multi-mode capabilities. Thus, the transceiver 1220 may include multiple transceivers for enabling the WTRU 1202 to communicate via multiple RATs, such as UTRA and IEEE 802.11, for example.

The processor 1218 of the WTRU 1202 may be coupled to, and may receive user input data from, the speaker/microphone 1224, the keypad 1226, and/or the display/touchpad 1228 (e.g., a liquid crystal display (LCD) display unit or organic light-emitting diode (OLED) display unit). The processor 1218 may also output user data to the speaker/microphone 1224, the keypad 1226, and/or the display/touchpad 1228. In addition, the processor 1218 may access information from, and store data in, any type of suitable memory, such as the non-removable memory 1230 and/or the removable memory 1232. The non-removable memory 1230 may include random-access memory (RAM), read-only memory (ROM), a hard disk, or any other type of memory storage device. The removable memory 1232 may include a subscriber identity module (SIM) card, a memory stick, a secure digital (SD) memory card, and the like. In other embodiments, the processor 1218 may access information from, and store data in, memory that is not physically located on the WTRU 1202, such as on a server or a home computer (not shown).

The processor 1218 may receive power from the power source 1234, and may be configured to distribute and/or control the power to the other components in the WTRU 1202. The power source 1234 may be any suitable device for powering the WTRU 1202. For example, the power source 1234 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 1218 may also be coupled to the GPS chipset 1236, which may be configured to provide location information (e.g., longitude and latitude) regarding the current location of the WTRU 1202. In addition to, or in lieu of, the information from the GPS chipset 1236, the WTRU 1202 may receive location information over the air interface 1216 from a base station (e.g., base stations 1214a, 1214b) and/or determine its location based on the timing of the signals being received from two or more nearby base stations. It should be appreciated that the WTRU 1202 may acquire location information by way of any suitable location-determination method while remaining consistent with an embodiment.

The processor 1218 may further be coupled to other peripherals 1238, which may include one or more software and/or hardware modules that provide additional features, functionality and/or wired or wireless connectivity. For example, the peripherals 1238 may include an accelerometer, an e-compass, a satellite transceiver, a digital camera (for photographs or video), a universal serial bus (USB)

port, a vibration device, a television transceiver, a hands free headset, a Bluetooth® module, a frequency modulated (FM) radio unit, a digital music player, a media player, a video game player module, an Internet browser, and the like.

Figure 17C:
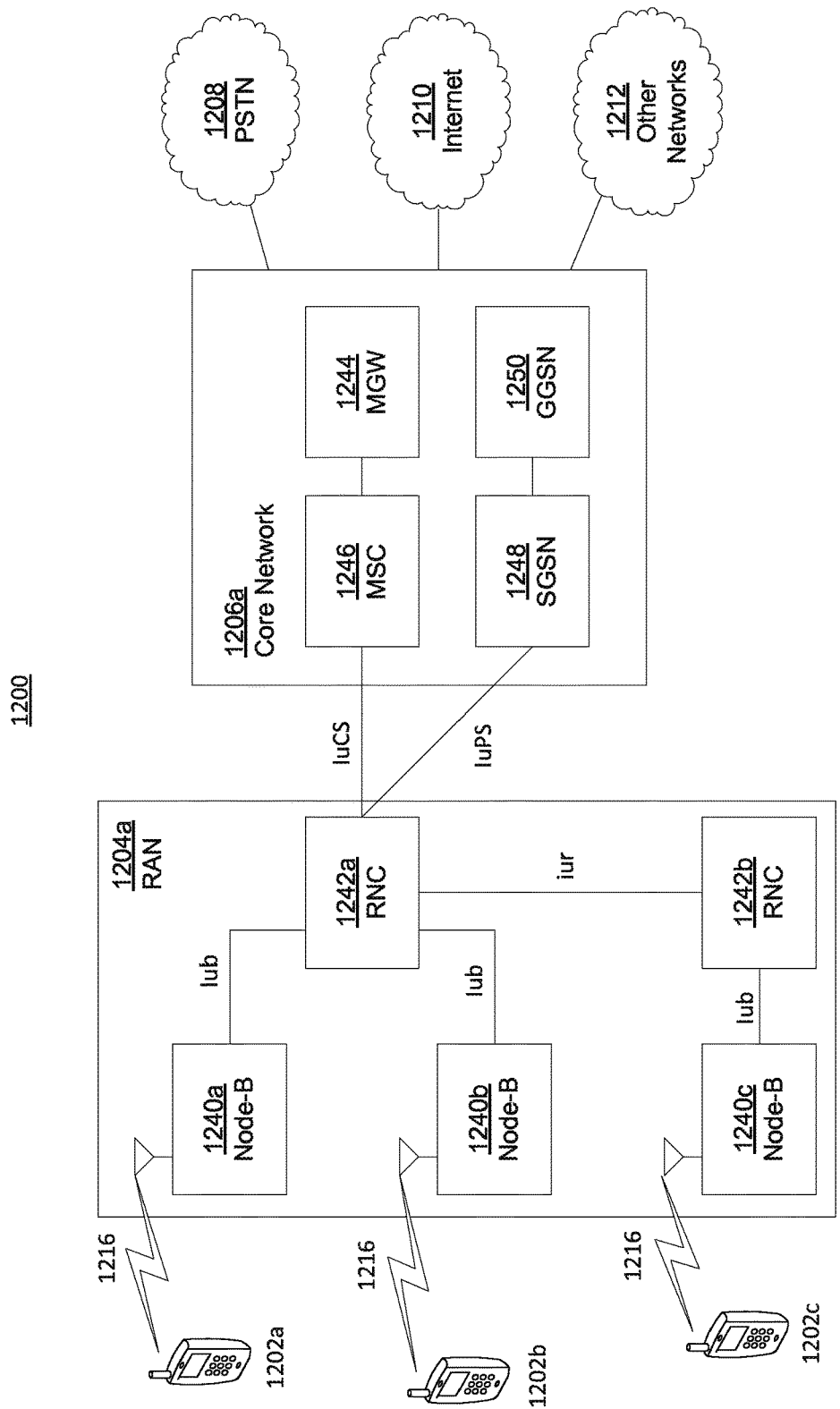
FIG. 17C depicts a system diagram of an example radio access network and an example core network that may be used within the communications system illustrated in FIG. 17A.

FIG. 17C is a system diagram of an embodiment of the communications system 1200 that includes a RAN 1204a and a core network 1206a that comprise example implementations of the RAN 1204 and the core network 1206, respectively. As noted above, the RAN 1204, for instance the RAN 1204a, may employ a UTRA radio technology to communicate with the WTRUs 1202a, 1202b, and 1202c over the air interface 1216. The RAN 1204a may also be in communication with the core network 1206a. As shown in FIG. 17C, the RAN 1204a may include Node-Bs 1240a, 1240b, 1240c, which may each include one or more transceivers for communicating with the WTRUs 1202a, 1202b, 1202c over the air interface 1216. The Node-Bs 1240a, 1240b, 1240c may each be associated with a particular cell (not shown) within the RAN 1204a. The RAN 1204a may also include RNCs 1242a, 1242b. It should be appreciated that the RAN 1204a may include any number of Node-Bs and RNCs while remaining consistent with an embodiment.

As shown in FIG. 17C, the Node-Bs 1240a, 1240b may be in communication with the RNC 1242a. Additionally, the Node-B 1240c may be in communication with the RNC 1242b. The Node-Bs 1240a, 1240b, 1240c may communicate with the respective RNCs 1242a, 1242b via an Iub interface. The RNCs 1242a, 1242b may be in communication with one another via an Iur interface. Each of the RNCs 1242a, 1242b may be configured to control the respective Node-Bs 1240a, 1240b, 1240c to which it is connected. In addition, each of the RNCs 1242a, 1242b may be configured to carry out or support other functionality, such as outer loop power control, load control, admission control, packet scheduling, handover control, macrodiversity, security functions, data encryption, and the like.

The core network 1206a shown in FIG. 17C may include a media gateway (MGW) 1244, a mobile switching center (MSC) 1246, a serving GPRS support node (SGSN) 1248, and/or a gateway GPRS support node (GCSN) 1250. While each of the foregoing elements is depicted as part of the core network 1206a, it should be appreciated that any one of these elements may be owned and/or operated by an entity other than the core network operator.

The RNC 1242a in the RAN 1204a may be connected to the MSC 1246 in the core network 1206a via an IuCS interface. The MSC 1246 may be connected to the MGW 1244. The MSC 1246 and the MGW 1244 may provide the WTRUs 1202a, 1202b, 1202c with access to circuit-switched networks, such as the PSTN 1208, to facilitate communications between the WTRUs 1202a, 1202b, 1202c and traditional land-line communications devices.

The RNC 1242a in the RAN 1204a may also be connected to the SGSN 1248 in the core network 1206a via an IuPS interface. The SGSN 1248 may be connected to the GGSN 1250. The SGSN 1248 and the GGSN 1250 may provide the WTRUs 1202a, 1202b, 1202c with access to packet-switched networks, such as the Internet 1210, to facilitate communications between and the WTRUs 1202a, 1202b, 1202c and IP-enabled devices.

As noted above, the core network 1206a may also be connected to the networks 1212, which may include other wired or wireless networks that are owned and/or operated by other service providers.

Figure 17D:
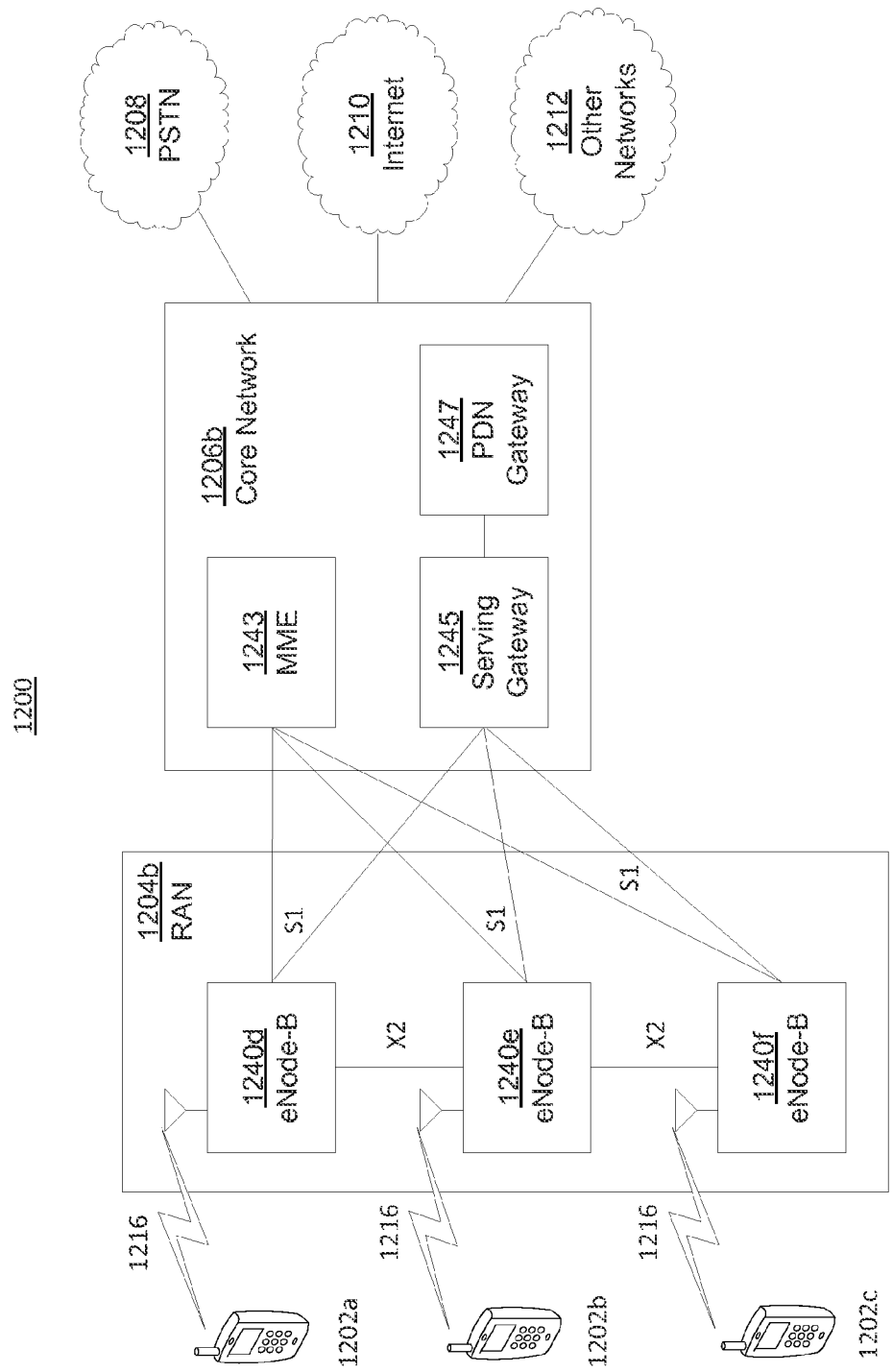
FIG. 17D depicts a system diagram of an example radio access network and an example core network that may be used within the communications system illustrated in FIG. 17A.

FIG. 17D is a system diagram of an embodiment of the communications system 1200 that includes a RAN 1204b and a core network 1206b that comprise example implementations of the RAN 1204 and the core network 1206, respectively. As noted above, the RAN 1204, for instance the RAN 1204b, may employ an E-UTRA radio technology to communicate with the WTRUs 1202a, 1202b, and 1202c over the air interface 1216. The RAN 1204b may also be in communication with the core network 1206b.

The RAN 1204b may include eNode-Bs 1240d, 1240e, 1240f, though it should be appreciated that the RAN 1204b may include any number of eNode-Bs while remaining consistent with an embodiment. The eNode-Bs 1240d, 1240e, 1240f may each include one or more transceivers for communicating with the WTRUs 1202a, 1202b, 1202c over the air interface 1216. In one embodiment, the eNode-Bs 1240d, 1240e, 1240f may implement MIMO technology. Thus, the eNode-B 1240d, for example, may use multiple antennas to transmit wireless signals to, and receive wireless signals from, the WTRU 1202a.

Each of the eNode-Bs 1240d, 1240e, and 1240f may be associated with a particular cell (not shown) and may be configured to handle radio resource management decisions, handover decisions, scheduling of users in the uplink and/or downlink, and the like. As shown in FIG. 17D the eNode-Bs 1240d, 1240e, 1240f may communicate with one another over an X2 interface.

The core network 1206b shown in FIG. 17D may include a mobility management gateway (MME) 1243, a serving gateway 1245, and a packet data network (PDN) gateway 1247. While each of the foregoing elements is depicted as part of the core network 1206b, it should be appreciated that any one of these elements may be owned and/or operated by an entity other than the core network operator.

The MME 1243 may be connected to each of the eNode-Bs 1240d, 1240e, and 1240f in the RAN 1204b via an S1 interface and may serve as a control node. For example, the MME 1243 may be responsible for authenticating users of the WTRUs 1202a, 1202b, 1202c, bearer activation/deactivation, selecting a particular serving gateway during an initial attach of the WTRUs 1202a, 1202b, 1202c, and the like. The MME 1243 may also provide a control plane function for switching between the RAN 1204b and other RANs (not shown) that employ other radio technologies, such as GSM or WCDMA.

The serving gateway 1245 may be connected to each of the eNode Bs 1240d, 1240e, 1240f in the RAN 1204b via the S1 interface. The serving gateway 1245 may generally route and forward user data packets to/from the WTRUs 1202a, 1202b, 1202c. The serving gateway 1245 may also perform other functions, such as anchoring user planes during inter-eNode B handovers, triggering paging when downlink data is available for the WTRUs 1202a, 1202b, 1202c, managing and storing contexts of the WTRUs 1202a, 1202b, 1202c, and the like.

The serving gateway 1245 may also be connected to the PDN gateway 1247, which may provide the WTRUs 1202a, 1202b, 1202c with access to packet-switched networks, such as the Internet 1210, to facilitate communications between the WTRUs 1202a, 1202b, 1202c and IP-enabled devices.

The core network 1206b may facilitate communications with other networks. For example, the core network 1206b may provide the WTRUs 1202a, 1202b, 1202c with access to circuit-switched networks, such as the PSTN 1208, to facilitate communications between the WTRUs 1202a, 1202b, 1202c and traditional land-line communications devices. For example, the core network 1206b may include, or may communicate with, an IP gateway (e.g., an IP multimedia subsystem (IMS) server) that serves as an interface between the core network 1206b and the PSTN 1208.

In addition, the core network 1206b may provide the WTRUs 1202a, 1202b, 1202c with access to the networks 1212, which may include other wired or wireless networks that are owned and/or operated by other service providers.

Figure 17E:
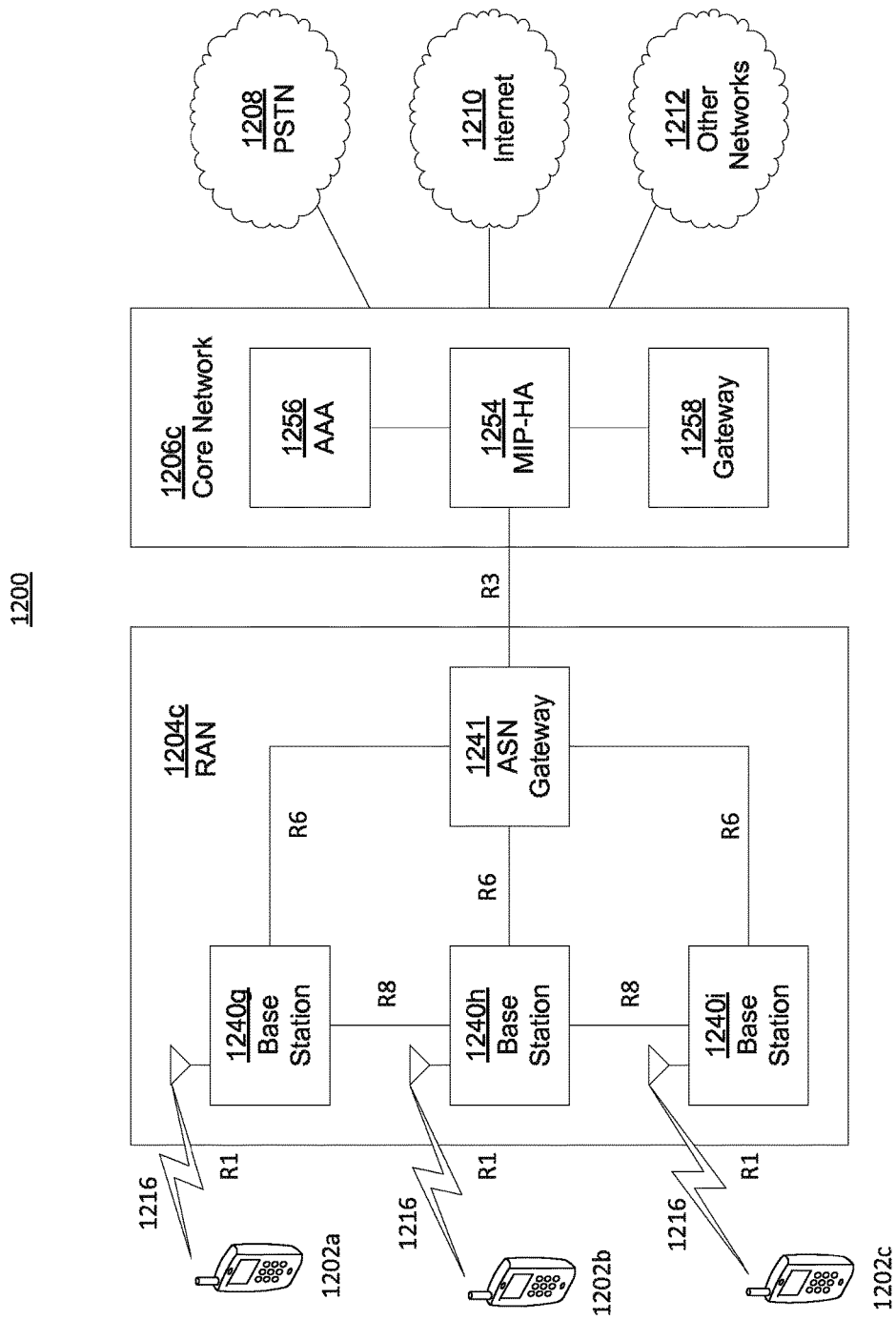
FIG. 17E depicts a system diagram of an example radio access network and an example core network that may be used within the communications system illustrated in FIG. 17A.

FIG. 17E is a system diagram of an embodiment of the communications system 1200 that includes a RAN 1204c and a core network 1206c that comprise example implementations of the RAN 1204 and the core network 1206, respectively. The RAN 1204, for instance the RAN 1204c, may be an access service network (ASN) that employs IEEE 802.16 radio technology to communicate with the WTRUs 1202a, 1202b, and 1202c over the air interface 1216. As described herein, the communication links between the different functional entities of the WTRUs 1202a, 1202b, 1202c, the RAN 1204c, and the core network 1206c may be defined as reference points.

As shown in FIG. 17E, the RAN 1204c may include base stations 1240g, 1240h, 1240i, and an ASN gateway 1241, though it should be appreciated that the RAN 1204c may include any number of base stations and ASN gateways while remaining consistent with an embodiment. The base stations 1202a, 1202b, 1202c may each be associated with a particular cell (not shown) in the RAN 1204c and may each include one or more transceivers for communicating with the WTRUs 1202a, 12026, 1202c over the air interface 1216. In one embodiment, the base stations 1240g, 1240h, 1240i may implement MIMO technology. Thus, the base station 1240g, for example, may use multiple antennas to transmit wireless signals to, and receive wireless signals from, the WTRU 1202a. The base stations 1240g, 1240h, 1240i may also provide mobility management functions, such as handoff triggering, tunnel establishment, radio resource management, traffic classification, quality of service (QoS) policy enforcement, and the like. The ASN Gateway 1241 may serve as a traffic aggregation point and may be responsible for paging, caching of subscriber profiles, routing to the core network 1206c, and the like.

The air interface 1216 between the WTRUs 1202a, 1202b, 1202c and the RAN 1204c may be defined as an R1 reference point that implements the IEEE 802.16 specification. In addition, each of the WTRUs 1202a, 1202b, and 1202c may establish a logical interface (not shown) with the core network 1206c. The logical interface between the WTRUs 1202a, 1202b, 1202c and the core network 1206c may be defined as an R2 reference point, which may be used for authentication, authorization, IP host configuration management, and/or mobility management.

The communication link between each of the base stations 1240g, 1240h, 1240i may be defined as an R8 reference point that includes protocols for facilitating WTRU handovers and the transfer of data between base stations. The communication link between the base stations 1240g, 1240h, 1240i and the ASN gateway 1241 may be defined as an R6 reference point. The R6 reference point may include protocols for facilitating mobility management based on mobility events associated with each of the WTRUs 1202a, 1202b, 1202c.

As shown in FIG. 17E, the RAN 1204c may be connected to the core network 1206c. The communication link between the RAN 1204c and the core network 1206c may defined as an R3 reference point that includes protocols for facilitating data transfer and mobility management capabilities, for example. The core network 1206c may include a mobile IP home agent (MIP-HA) 1244, an authentication, authorization, accounting (AAA) server 1256, and a gateway 1258. While each of the foregoing elements is depicted as part of the core network 1206c, it should be appreciated that any one of these elements may be owned and/or operated by an entity other than the core network operator.

The MIP-HA may be responsible for IP address management, and may enable the WTRUs 1202a, 1202b, and 1202c to roam between different ASNs and/or different core networks. The MIP-HA 1254 may provide the WTRUs 1202a, 1202b, 1202c with access to packet-switched networks, such as the Internet 1210, to facilitate communications between the WTRUs 1202a, 1202b, 1202c and IP-enabled devices. The AAA server 1256 may be responsible for user authentication and for supporting user services. The gateway 1258 may facilitate interworking with other networks. For example, the gateway 1258 may provide the WTRUs 1202a, 1202b, 1202c with access to circuit-switched networks, such as the PSTN 1208, to facilitate communications between the WTRUs 1202a, 1202b, 1202c and traditional landline communications devices. In addition, the gateway 1258 tray provide the WTRUs 1202a, 1202b, 1202c with access to the networks 1212, which may include other wired or wireless networks that are owned and/or operated by other service providers.

Although not shown in FIG. 17E, it should be appreciated that the RAN 1204c may be connected to other ASNs and the core network 1206c may be connected to other core networks. The communication link between the RAN 1204c the other ASNs may be defined as an R4 reference point, which may include protocols for coordinating the mobility of the WTRUs 1202a, 1202b, 1202c between the RAN 1204c and the other ASNs. The communication link between the core network 1206c and the other core networks may be defined as an R5 reference point, which may include protocols for facilitating interworking between home core networks and visited core networks.

Although features and elements are described above in particular combinations, one of ordinary skill in the art will appreciate that each feature or element may be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read-only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, WTRU, terminal, base station, RNC, or any host computer. Features and/or elements described herein in accordance with one or more example embodiments may be used in combination with features and/or elements described herein in accordance with one or more other example embodiments.

What is claimed:

1. A method of video coding, the method comprising:
   obtaining a reference picture list associated with a current prediction unit;
   obtaining a candidate reference picture list from a plurality of candidate reference picture lists associated with a co-located prediction unit that is co-located with the current prediction unit;
   determining whether a motion vector scaling operation is associated with using the candidate reference picture list as a motion vector prediction reference picture list associated with the co-located prediction unit; and selecting the motion vector prediction reference picture list associated with the co-located prediction unit from the plurality of candidate reference picture lists based on the determining.

2. The method of claim 1, wherein the selecting further comprising:
selecting the candidate reference picture list as the motion vector prediction reference picture list based on a determination that a motion vector scaling operation is not associated with using the candidate reference picture list as the motion vector prediction reference picture list associated with the co-located prediction unit.

3. The method of claim 1, wherein the determining further comprising:
determining that a motion vector scaling operation is not associated with using the candidate reference picture list as the motion vector prediction reference picture list associated with the co-located prediction unit on a condition that the reference pictures in the reference picture list associated with the current prediction unit have the same picture order count (POC) values as the reference pictures in the candidate reference picture list associated with the co-located prediction unit.

4. The method of claim 1, wherein the determining further comprising:
determining that a motion vector scaling operation is not associated with using the candidate reference picture list as the motion vector prediction reference picture list associated with the co-located prediction unit on a condition that the candidate reference picture list has a same reference list index as the reference picture list associated with the current prediction unit.

5. The method of claim 1, wherein the determining further comprising:
determining a motion vector scaling operation is not associated with using the candidate reference picture list as the motion vector prediction reference picture list associated with the co-located prediction unit on a condition that the candidate reference picture list comprises a reference picture having a same POC distance from a picture associated with the co-located prediction unit as the POC distance between a picture associated with the current prediction unit and a reference picture in the reference picture list associated with the current prediction unit.

6. The method of claim 1, the selecting further comprising:
considering another candidate reference picture list as the motion vector prediction reference picture list based on a determination that a motion vector scaling operation is associated with using the candidate reference picture list as the motion vector prediction reference picture list associated with the co-located prediction unit.

7. The method of claim 1, the selecting further comprising:
selecting a default candidate reference picture list as the motion vector prediction reference picture list associated with the co-located prediction unit on a condition that the plurality of candidate reference picture lists do not comprise a reference picture having a same POC distance from a picture associated with the co-located prediction unit as the POC distance between a picture associated with the current prediction unit and a reference picture in the reference picture list associated with the current prediction unit.

8. A method of video coding, the method comprising:
retrieving a reference picture from a reference picture list associated with a current prediction unit, the reference picture list comprising a plurality of reference pictures;
determining whether a motion vector scaling operation is associated with using the reference picture as a motion vector prediction candidate for performing motion vector prediction; and
selecting the motion vector prediction candidate from the reference pictures in the reference picture list associated with the current prediction unit based on the determining, wherein the reference picture as the motion vector prediction candidate is selected based on a determination that a motion vector scaling operation is not associated with using the reference picture as the motion vector prediction candidate for performing motion vector prediction, and the reference picture from the reference picture list associated with the current prediction unit is excluded from being considered for the motion vector prediction candidate based on a determination that a motion vector scaling operation is associated with using the reference picture as the motion vector prediction candidate for performing motion vector prediction.

9. The method of claim 8, wherein determining further comprising:
determining that a motion vector scaling operation is not associated with using the reference picture as the motion vector prediction candidate for performing motion vector prediction on a condition that the reference picture has a same POC value as a reference picture of a co-located prediction unit.

10. The method of claim 8, wherein determining further comprising:
determining that a motion vector scaling operation is not associated with using the reference picture as the motion vector prediction candidate for performing motion vector prediction on a condition that the reference picture has a same POC distance from a picture associated with the current prediction unit as the POC distance between a picture associated with a co-located prediction unit and a reference picture of the co-located prediction unit.

11. A wireless transmit/receive unit (WTRU) for video coding, the WTRU comprising:
a processor configured to:
obtain a reference picture list associated with a current prediction unit;
obtain a candidate reference picture list from a plurality of candidate reference picture lists associated with a co-located prediction unit that is co-located with the current prediction unit;
determine whether a motion vector scaling operation is associated with using the candidate reference picture list as a motion vector prediction reference picture list associated with the co-located prediction unit; and
select the motion vector prediction reference picture list associated with the co-located prediction unit from the plurality of candidate reference picture lists based on the determining.

12. The WTRU of claim 11, wherein the reference picture list associated with the current prediction unit comprises a plurality of reference pictures, and the processor is further configured to:
  retrieve a reference picture from the reference picture list associated with the current prediction unit;
  determine whether a motion vector scaling operation is associated with using the reference picture as a motion vector prediction candidate for performing motion vector prediction; and
  select the motion vector prediction candidate from the reference picture list associated with the current prediction unit based on the determining.

13. The WTRU of claim 12, wherein the processor is further configured to select the reference picture as the motion vector prediction candidate based on a determination that a motion vector scaling operation is not associated with using the reference picture as the motion vector prediction candidate for performing motion vector prediction.

14. The WTRU of claim 12, wherein the processor is further configured to determine that a motion vector scaling operation is not associated with using the reference picture as the motion vector prediction candidate for performing motion vector prediction on a condition that the reference picture has a same POC value as a reference picture of the co-located prediction unit.

15. The WTRU of claim 12, wherein the processor is further configured to determine that a motion vector scaling operation is not associated with using the reference picture as the motion vector prediction candidate for performing motion vector prediction on a condition that the reference picture has a same POC distance from a picture associated with the current prediction unit as the POC distance between a picture associated with the co-located prediction unit and a reference picture of the co-located prediction unit.

16. The WTRU of claim 15, wherein the POC distance between the co-located prediction unit and a reference picture of the co-located prediction unit comprises a difference between a POC value associated with a co-located picture associated with the co-located prediction unit and a POC value associated with the reference picture of the co-located prediction unit.

17. The WTRU of claim 12, wherein the processor is further configured to:
  calculate a first POC distance between the reference picture and a picture associated with the current prediction unit;
  calculate a second POC distance between a reference picture of the co-located prediction unit and a picture associated with the co-located prediction unit; and
  determine whether a motion vector scaling operation is associated with using the reference picture as the motion vector prediction candidate for performing motion vector prediction based on a comparing of the first and the second POC distances.

18. The WTRU of claim 17, wherein the processor is further configured to determine that a motion vector scaling operation is not associated with using the reference picture as the motion vector prediction candidate for performing motion vector prediction on a condition that the first POC distance equals to the second POC distance.

19. The WTRU of claim 12, wherein the processor is further configured to perform at least one of: add the motion vector prediction candidate to a merging candidate list in a position before that of a spatial motion vector prediction candidate or add the motion vector prediction candidate to a merging candidate list in place of a spatial motion vector prediction candidate.

* * * * *